USO09981662B2

(12) United States Patent
Lavoie et al.

(10) Patent No.: US 9,981,662 B2
(45) Date of Patent: May 29, 2018

(54) SPEED LIMITING COMFORT ENHANCEMENT

(71) Applicant: Ford Global Technologies, LLC, Dearborn, MI (US)

(72) Inventors: Erick Michael Lavoie, Dearborn, MI (US); Joseph M. Raad, Farmington, MI (US); Donald Jacob Mattern, Canton, MI (US)

(73) Assignee: Ford Global Technologies, LLC, Dearborn, MI (US)

( * ) Notice: Subject to any disclaimer, the term of this patent is extended or adjusted under 35 U.S.C. 154(b) by 78 days.

(21) Appl. No.: 14/884,387

(22) Filed: Oct. 15, 2015

(65) Prior Publication Data
US 2017/0106869 A1    Apr. 20, 2017

(51) Int. Cl.
| | |
|---|---|
| *B60W 30/18* | (2012.01) |
| *B60T 7/20* | (2006.01) |
| *B60W 10/18* | (2012.01) |
| *B60W 10/20* | (2006.01) |
| *B60T 8/17* | (2006.01) |

(Continued)

(52) U.S. Cl.
CPC ......... *B60W 30/18036* (2013.01); *B60T 7/20* (2013.01); *B60T 8/1708* (2013.01); *B60W 10/06* (2013.01); *B60W 10/18* (2013.01); *B60W 10/184* (2013.01); *B60W 10/20* (2013.01); *B60W 2050/0026* (2013.01); *B60W 2050/0056* (2013.01); *B60W 2510/182* (2013.01); *B60W 2520/10* (2013.01); *B60W 2530/10* (2013.01); *B60W 2550/142* (2013.01);
(Continued)

(58) Field of Classification Search
None
See application file for complete search history.

(56) References Cited

U.S. PATENT DOCUMENTS 3,542,390 A    11/1970   Fikse
3,756,624 A     9/1973   Taylor
(Continued)

FOREIGN PATENT DOCUMENTS

CN    202159367 U    3/2012
DE      3931518 A1    4/1991
(Continued)

OTHER PUBLICATIONS

SH. Azadi, H.R. Rezaei Nedamani, and R. Kazemi, "Automatic Parking of an Articulated Vehicle Using ANFIS", Global Journal of Science, Engineering and Technology (ISSN: 2322-2441), 2013, pp. 93-104, Issue No. 14.

(Continued)

*Primary Examiner* — Mussa A Shaawat
*Assistant Examiner* — Kyung J Kim
(74) *Attorney, Agent, or Firm* — Vichit Chea; Price Heneveld LLP

(57) ABSTRACT

A vehicle includes a speed detector detecting a vehicle speed, a brake system and a control system implementing a control mode including determining a threshold speed. The control system further derives an initial brake torque demand proportional to an error between the threshold speed and a vehicle speed exceeding the threshold speed and outputs to the brake system a rate-limited brake torque demand by applying a rate-limit operator based on the error to the initial brake torque demand.

20 Claims, 10 Drawing Sheets

(51) Int. Cl.
*B60W 10/06* (2006.01)
*B60W 10/184* (2012.01)
*B60W 50/00* (2006.01)

(52) U.S. Cl.
CPC ............... *B60W 2710/0666* (2013.01); *B60W 2710/182* (2013.01); *B60W 2720/10* (2013.01)

(56) References Cited

U.S. PATENT DOCUMENTS

| | | | |
|---|---|---|---|
| 3,860,257 A | 1/1975 | Mesly | |
| 4,042,132 A | 8/1977 | Bohman et al. | |
| 4,735,432 A | 4/1988 | Brown | |
| 4,752,080 A | 6/1988 | Rogers | |
| 4,848,499 A | 7/1989 | Martinet et al. | |
| 5,001,639 A | 3/1991 | Breen | |
| 5,108,158 A | 4/1992 | Breen | |
| 5,246,242 A | 9/1993 | Penzotti | |
| 5,247,442 A | 9/1993 | Kendall | |
| 5,558,350 A | 9/1996 | Kimbrough et al. | |
| 5,586,814 A | 12/1996 | Steiner | |
| 6,042,196 A | 3/2000 | Nakamura et al. | |
| 6,056,371 A | 5/2000 | Lin et al. | |
| 6,292,094 B1 | 9/2001 | Deng et al. | |
| 6,351,698 B1 | 2/2002 | Kubota et al. | |
| 6,389,342 B1 | 5/2002 | Kanda | |
| 6,409,288 B2 | 6/2002 | Yoshida et al. | |
| 6,494,476 B2 | 12/2002 | Masters et al. | |
| 6,498,977 B2 | 12/2002 | Wetzel et al. | |
| 6,567,731 B2 | 5/2003 | Chandy | |
| 6,838,979 B2 | 1/2005 | Deng et al. | |
| 6,854,557 B1 | 2/2005 | Deng et al. | |
| 7,032,705 B2 | 4/2006 | Zheng et al. | |
| 7,117,077 B2 | 10/2006 | Michi et al. | |
| 7,136,754 B2 | 11/2006 | Hahn et al. | |
| 7,139,650 B2 | 11/2006 | Lubischer | |
| 7,154,385 B2 | 12/2006 | Lee et al. | |
| 7,165,820 B2 | 1/2007 | Rudd, III | |
| 7,219,913 B2 | 5/2007 | Atley | |
| 7,319,927 B1 * | 1/2008 | Sun .................. | B60W 10/06 180/170 |
| 7,546,191 B2 | 6/2009 | Lin et al. | |
| 7,690,737 B2 | 4/2010 | Lu | |
| 7,706,944 B2 | 4/2010 | Tanaka et al. | |
| 7,715,953 B2 | 5/2010 | Shepard | |
| 7,793,965 B2 | 9/2010 | Padula | |
| 7,969,326 B2 | 6/2011 | Sakakibara | |
| 8,010,253 B2 | 8/2011 | Lundquist | |
| 8,033,955 B2 | 10/2011 | Farnsworth | |
| 8,036,792 B2 | 10/2011 | Dechamp | |
| 8,108,116 B2 | 1/2012 | Mori et al. | |
| 8,139,109 B2 | 3/2012 | Schmiedel et al. | |
| 8,170,726 B2 | 5/2012 | Chen et al. | |
| 8,244,442 B2 | 8/2012 | Craig et al. | |
| 8,260,518 B2 | 9/2012 | Englert | |
| 8,267,485 B2 | 9/2012 | Barlsen et al. | |
| 8,280,607 B2 | 10/2012 | Gatti et al. | |
| 8,374,749 B2 | 2/2013 | Tanaka | |
| 8,430,792 B2 | 4/2013 | Noll | |
| 8,469,125 B2 | 6/2013 | Yu et al. | |
| 8,571,758 B2 | 10/2013 | Klier et al. | |
| 8,755,982 B2 | 6/2014 | Heckel et al. | |
| 8,755,984 B2 | 6/2014 | Rupp et al. | |
| 8,798,860 B2 | 8/2014 | Dechamp | |
| 8,909,426 B2 | 12/2014 | Rhode et al. | |
| 8,930,140 B2 | 1/2015 | Trombley et al. | |
| 9,102,271 B2 | 8/2015 | Trombley et al. | |
| 9,108,598 B2 | 8/2015 | Headley | |
| 9,132,856 B2 | 9/2015 | Shepard | |
| 9,156,496 B2 | 10/2015 | Greenwood et al. | |
| 9,164,955 B2 | 10/2015 | Lavoie et al. | |
| 9,180,890 B2 | 11/2015 | Lu et al. | |
| 9,227,474 B2 | 1/2016 | Liu | |
| 9,229,453 B1 | 1/2016 | Lee | |
| 9,238,483 B2 | 1/2016 | Hafner et al. | |
| 9,248,858 B2 | 2/2016 | Lavoie et al. | |
| 9,315,212 B1 | 4/2016 | Kyrtsos et al. | |
| 9,335,162 B2 | 5/2016 | Kyrtsos et al. | |
| 9,340,228 B2 | 5/2016 | Xu et al. | |
| 9,500,497 B2 | 11/2016 | Lavoie et al. | |
| 2001/0037164 A1 | 11/2001 | Hecker | |
| 2001/0052434 A1 | 12/2001 | Ehrlich et al. | |
| 2004/0222881 A1 | 11/2004 | Deng et al. | |
| 2005/0206224 A1 | 9/2005 | Lu | |
| 2005/0206225 A1 | 9/2005 | Offerle et al. | |
| 2005/0206229 A1 | 9/2005 | Lu et al. | |
| 2005/0236201 A1 | 10/2005 | Spannheimer et al. | |
| 2005/0236896 A1 | 10/2005 | Offerle et al. | |
| 2006/0103511 A1 | 5/2006 | Lee et al. | |
| 2006/0142936 A1 | 6/2006 | Dix | |
| 2006/0241844 A1 * | 10/2006 | Mori .................. | B60T 8/00 701/93 |
| 2007/0027581 A1 | 2/2007 | Bauer et al. | |
| 2007/0198190 A1 | 8/2007 | Bauer et al. | |
| 2008/0177443 A1 | 7/2008 | Lee et al. | |
| 2008/0231701 A1 | 9/2008 | Greenwood et al. | |
| 2009/0082935 A1 | 3/2009 | Leschuk et al. | |
| 2009/0157260 A1 | 6/2009 | Lee | |
| 2009/0198425 A1 | 8/2009 | Englert | |
| 2009/0271078 A1 | 10/2009 | Dickinson | |
| 2009/0306854 A1 | 12/2009 | Dechamp | |
| 2009/0306861 A1 | 12/2009 | Schumann et al. | |
| 2009/0326775 A1 | 12/2009 | Nishida | |
| 2010/0152989 A1 | 6/2010 | Smith et al. | |
| 2011/0087398 A1 | 4/2011 | Lu et al. | |
| 2012/0041658 A1 | 2/2012 | Turner | |
| 2012/0095649 A1 | 4/2012 | Klier et al. | |
| 2012/0200706 A1 | 8/2012 | Greenwood et al. | |
| 2012/0271512 A1 | 10/2012 | Rupp et al. | |
| 2012/0271514 A1 | 10/2012 | Lavoie et al. | |
| 2012/0271515 A1 | 10/2012 | Rhode et al. | |
| 2012/0271522 A1 | 10/2012 | Rupp et al. | |
| 2012/0283909 A1 | 11/2012 | Dix | |
| 2012/0310594 A1 | 12/2012 | Watanabe | |
| 2012/0316732 A1 | 12/2012 | Auer | |
| 2013/0148748 A1 | 6/2013 | Suda | |
| 2013/0179038 A1 | 7/2013 | Goswami et al. | |
| 2013/0268160 A1 | 10/2013 | Trombley et al. | |
| 2014/0052337 A1 | 2/2014 | Lavoie et al. | |
| 2014/0058614 A1 | 2/2014 | Trombley et al. | |
| 2014/0058622 A1 | 2/2014 | Trombley et al. | |
| 2014/0058655 A1 | 2/2014 | Trombley et al. | |
| 2014/0058668 A1 | 2/2014 | Trombley et al. | |
| 2014/0067154 A1 | 3/2014 | Yu et al. | |
| 2014/0067155 A1 | 3/2014 | Yu et al. | |
| 2014/0085472 A1 | 3/2014 | Lu et al. | |
| 2014/0121930 A1 | 5/2014 | Allexi et al. | |
| 2014/0160276 A1 | 6/2014 | Pliefke et al. | |
| 2014/0172232 A1 | 6/2014 | Rupp et al. | |
| 2014/0188344 A1 | 7/2014 | Lavoie | |
| 2014/0188346 A1 | 7/2014 | Lavoie | |
| 2014/0210456 A1 | 7/2014 | Crossman | |
| 2014/0218506 A1 | 8/2014 | Trombley et al. | |
| 2014/0218522 A1 | 8/2014 | Lavoie et al. | |
| 2014/0222288 A1 | 8/2014 | Lavoie et al. | |
| 2014/0236532 A1 | 8/2014 | Trombley et al. | |
| 2014/0249691 A1 | 9/2014 | Hafner et al. | |
| 2014/0267688 A1 | 9/2014 | Aich et al. | |
| 2014/0267689 A1 | 9/2014 | Lavoie | |
| 2014/0267868 A1 | 9/2014 | Mazzola et al. | |
| 2014/0267869 A1 | 9/2014 | Sawa | |
| 2014/0277942 A1 | 9/2014 | Kyrtsos et al. | |
| 2014/0297128 A1 | 10/2014 | Lavoie et al. | |
| 2014/0297129 A1 | 10/2014 | Lavoie et al. | |
| 2014/0303847 A1 | 10/2014 | Lavoie | |
| 2014/0309888 A1 | 10/2014 | Smit et al. | |
| 2014/0324295 A1 | 10/2014 | Lavoie | |
| 2014/0343795 A1 | 11/2014 | Lavoie | |
| 2014/0358429 A1 | 12/2014 | Shutko et al. | |
| 2014/0379217 A1 | 12/2014 | Rupp et al. | |
| 2015/0025732 A1 | 1/2015 | Min et al. | |
| 2015/0057903 A1 | 2/2015 | Rhode et al. | |
| 2015/0066296 A1 | 3/2015 | Trombley et al. | |
| 2015/0066298 A1 | 3/2015 | Sharma et al. | |
| 2015/0120141 A1 | 4/2015 | Lavoie et al. | |

(56) References Cited

U.S. PATENT DOCUMENTS

| | | |
|---|---|---|
| 2015/0134183 A1 | 5/2015 | Lavoie et al. |
| 2015/0138340 A1 | 5/2015 | Lavoie |
| 2015/0158527 A1 | 6/2015 | Hafner et al. |
| 2015/0203156 A1 | 7/2015 | Hafner et al. |
| 2015/0210317 A1 | 7/2015 | Hafner et al. |
| 2015/0217693 A1 | 8/2015 | Pliefke et al. |
| 2015/0232092 A1 | 8/2015 | Fairgrieve et al. |
| 2016/0001705 A1 | 1/2016 | Greenwood et al. |
| 2016/0009288 A1 | 1/2016 | Yu |
| 2016/0039456 A1 | 2/2016 | Lavoie et al. |
| 2016/0052548 A1 | 2/2016 | Singh et al. |
| 2016/0059888 A1 | 3/2016 | Bradley et al. |
| 2016/0129939 A1 | 5/2016 | Singh et al. |

FOREIGN PATENT DOCUMENTS

| | | |
|---|---|---|
| DE | 9208595 U1 | 8/1992 |
| DE | 10154612 A1 | 5/2003 |
| DE | 102005043466 A1 | 3/2007 |
| DE | 102005043467 A1 | 3/2007 |
| DE | 102005043468 A1 | 3/2007 |
| DE | 102006002294 A1 | 7/2007 |
| DE | 102007029413 A1 | 1/2009 |
| DE | 102006035021 B4 | 4/2010 |
| DE | 102008043675 A1 | 5/2010 |
| DE | 102009007990 A1 | 8/2010 |
| DE | 102009012253 A1 | 9/2010 |
| DE | 102010029184 A1 | 11/2011 |
| EP | 0418653 A1 | 3/1991 |
| EP | 1361543 A2 | 11/2003 |
| EP | 1655191 A1 | 5/2006 |
| EP | 1810913 A1 | 7/2007 |
| EP | 2388180 A2 | 11/2011 |
| EP | 2644477 A1 | 10/2013 |
| FR | 2515379 A1 | 4/1983 |
| JP | 09267762 A | 10/1997 |
| JP | 10119739 A | 5/1998 |
| JP | 2012166580 A | 9/2012 |
| WO | 0044605 A1 | 8/2000 |
| WO | 2012059207 A1 | 5/2012 |
| WO | 2012103193 A1 | 8/2012 |
| WO | 2013186208 A2 | 12/2013 |
| WO | 2015187467 A1 | 12/2015 |

OTHER PUBLICATIONS

F. Cuesta and A. Ollero, "Intelligent System for Parallel Parking of Cars and Tractor-Trailers", Intelligent Mobile Robot Navigation, STAR, 2005, pp. 159-188, Springer-Verlag Berlin Heidelberg.

M. Khatib, H. Jaouni, R. Chatila, and J.P. Laumond; "Dynamic Path Modification for Car-Like Nonholonomic Mobile Robots," IEEE, International Conference on Robotics and Automation, Albuquerque, New Mexico, Apr. 1997, 6 pages.

Haviland, G S, "Automatic Brake Control for Trucks—What Good Is It?", TRID, Society of Automotive Engineers, Sep. 1968, 1 pg.

Altafini, C.; Speranzon, A.; Wahlberg, B., "A Feedback Control Scheme for Reversing a Truck and Trailer Vehicle", IEEE, Robotics and Automation, IEEE Transactions, Dec. 2001, vol. 17, No. 6, 2 pgs.

Claudio Altafini, Alberto Speranzon, and Karl Henrik Johansson, "Hybrid Control of a Truck and Trailer Vehicle", Springer-Verlag Berlin Heidelberg, HSCC 2002, LNCS 2289; 2002, pp. 21-34.

Divelbiss, A.W.; Wen, J.T.; "Trajectory Tracking Control of a Car-Trailer System", IEEE, Control Systems Technology, Aug. 6, 2002, vol. 5, No. 3, 1 pg.

Guanrong, Chen; Delin, Zhang; "Backing up a Truck-Trailer with Suboptimal Distance Trajectories", IEEE, Proceedings of the Fifth IEEE International Conference, vol. 2, Aug. 6, 2002, New Orleans, LA, ISBN:0-7803-3645-3, 1 pg.

"Understanding Tractor-Trailer Performance", Caterpillar, 2006, pp. 1-28.

C. Lundquist; W. Reinelt; O. Enqvist, "Back Driving Assistant for Passenger Cars with Trailer", ZF Lenksysteme GmbH, Schwäbisch Gmünd, Germany, 2006 (SAE Int'l) Jan. 2006, pp. 1-8.

Olof Enqvist, "AFS-Assisted Trailer Reversing," Institutionen för systemteknik Deartment of Electrical Engineering, Jan. 27, 2006, 57 pgs.

Cedric Pradalier, Kane Usher, "Robust Trajectory Tracking for a Reversing Tractor-Trailer System", (Draft), and Field Service Robotics Conference, CSIRO ICT Centre, Jul. 2007, 16 pages.

Hodo, D. W.; Hung, J.Y.; Bevly, D. M.; Millhouse, S., "Effects of Sensor Placement and Errors on Path Following Control of a Mobile Robot-Trailer System", IEEE, American Control Conference, Jul. 30, 2007, 1 pg.

Cedric Pradalier, Kane Usher, "Experiments in Autonomous Reversing of a Tractor-Trailer System", 6th International Conference on Field and Service Robotics, inria-00195700, Version 1, Dec. 2007, 10 pgs.

Zhe Leng; Minor, M., "A Simple Tractor-Trailer Backing Control Law for Path Following", IEEE, Intelligent Robots and Systems (IROS) IEEE/RSJ International Conference, Oct. 2010, 2 pgs.

"2012 Edge—Trailer Towing Selector", Brochure, Preliminary 2012 RV & Trailer Towing Guide Information, 2011, 3 pgs.

"Ford Super Duty: Truck Technologies", Brochure, Sep. 2011, 2 pgs.

J. Roh; H. Lee; W. Chung, "Control of a Car with a Trailer Using the Driver Assistance System", IEEE, International Conference on Robotics and Biomimetics; Phuket, Thailand, Dec. 2011, 1 pg.

Payne, M.L.;Hung, J.Y, and Bevy, D.M; "Control of a Robot-Trailer System Using a Single Non-Collacted Sensor", IEEE, 38th Annual Conference on IEEE Industrial Electronics Society, Oct. 25-28, 2012, 2 pgs.

"Optionally Unmanned Ground Systems for any Steering-Wheel Based Vehicle" Universal. Unmanned., Kairos Autonomi, website: http://www.kairosautonomi.com/pronto4_system.html, retrieved Sep. 26, 2014, 2 pgs.

Micah Steele, R. Brent Gillespie, "Shared Control Between Human and Machine: Using a Haptic Steering Wheel to Aid in Land Vehicle Guidance", University of Michigan, Date Unknown, 5 pgs.

* cited by examiner

SPEED LIMITING COMFORT ENHANCEMENT

FIELD OF THE INVENTION

The present invention generally relates to systems for controlling vehicle parameters during vehicle guidance of a trailer, such as in a trailer backup assist system. In particular, various systems are disclosed for controlling the speed or a vehicle during use of a trailer backup assist system.

BACKGROUND OF THE INVENTION

Reversing a vehicle while towing a trailer can be challenging for many drivers, particularly for drivers that drive with a trailer on an infrequent basis or with various types of trailers. Systems used to assist a driver with backing a trailer can control various vehicle systems to attempt to keep the speed of the towing vehicle below a limit where such systems become unreliable, particularly at preventing the trailer from converging toward a jackknife angle or the like. Further advances in such systems may be desired.

SUMMARY OF THE INVENTION

According to one aspect of the present invention, a vehicle includes a speed detector detecting a vehicle speed, a brake system and a control system implementing a control mode including determining a threshold speed. The control system further derives an initial brake torque demand proportional to an error between the threshold speed and a vehicle speed exceeding the threshold speed and outputs to the brake system a rate-limited brake torque demand by applying a rate-limit operator based on the error to the initial brake torque demand.

According to another aspect of the present invention, a backup assist system for a vehicle reversing a trailer includes a steering module, a brake module and a speed detector detecting a vehicle speed. The system also includes a controller outputting a steering command to the steering module to control reversing of the trailer and determining an excess speed error based on a detected vehicle speed and a calculated threshold speed and outputting to the brake module a torque demand proportional to and rate-limited based on the error.

According to another aspect of the present invention, a method for assisting reversing of a vehicle with a trailer includes controlling a vehicle steering system according to a reversing trailer command. The method further includes determining an excess speed error based on a detected vehicle speed and a threshold speed calculated based on the reversing trailer command and controlling a vehicle brake system according to a torque demand proportional to the error and rate-limited based on the error.

These and other aspects, objects, and features of the present invention will be understood and appreciated by those skilled in the art upon studying the following specification, claims, and appended drawings.

DETAILED DESCRIPTION OF THE PREFERRED EMBODIMENTS

Figure 1:
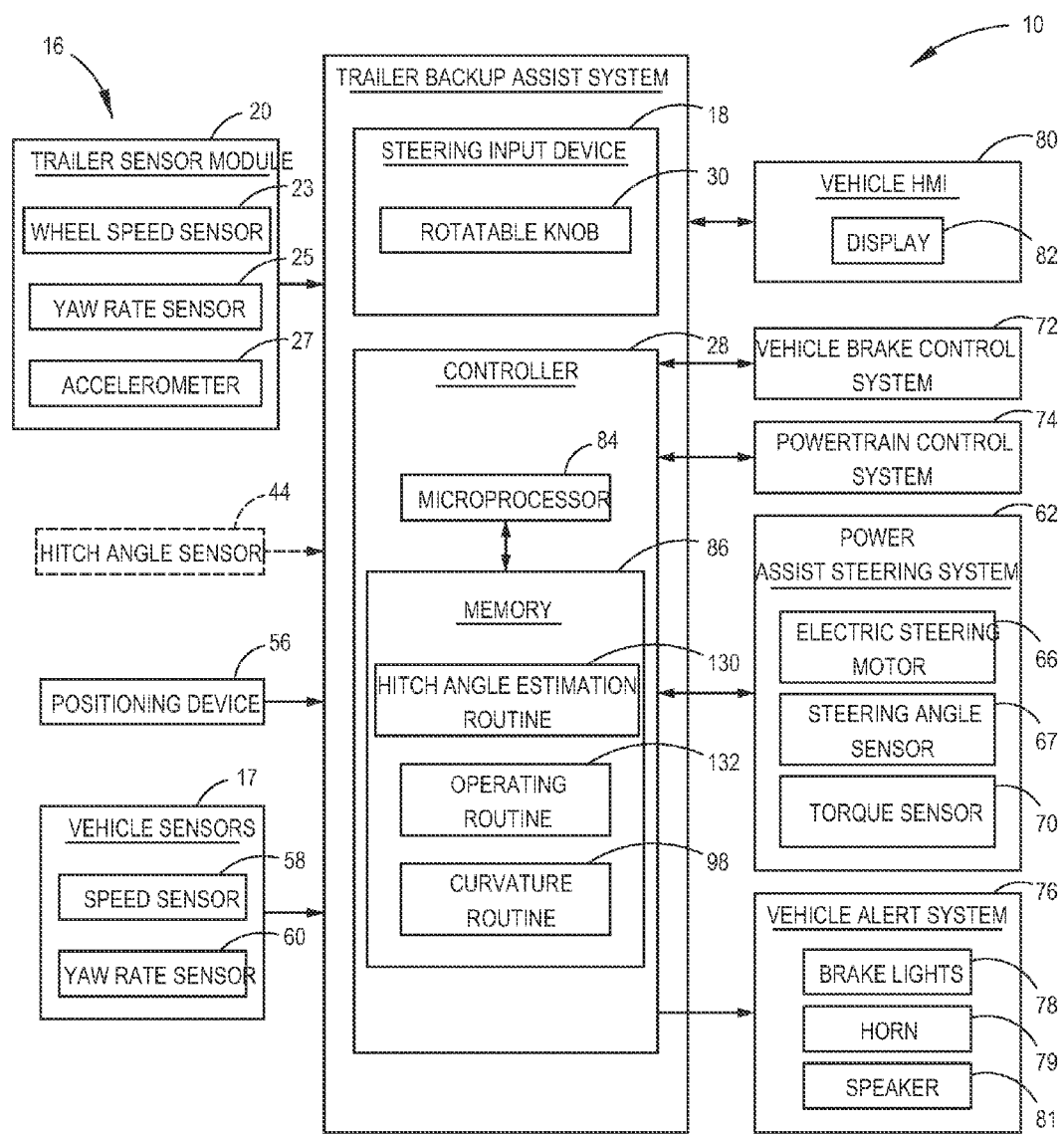
FIG. 1 is a block diagram illustrating one embodiment of the trailer backup assist system having a steering input device, a curvature controller, and a trailer braking system.

For purposes of description herein, the terms "upper," "lower," "right," "left," "rear," "front," "vertical," "horizontal," "interior," "exterior," and derivatives thereof shall relate to the invention as oriented in FIG. 1. However, it is to be understood that the invention may assume various alternative orientations, except where expressly specified to the contrary. It is also to be understood that the specific devices and processes illustrated in the attached drawing, and described in the following specification are simply exemplary embodiments of the inventive concepts defined in the appended claims. Hence, specific dimensions and other physical characteristics relating to the embodiments disclosed herein are not to be considered as limiting, unless the claims expressly state otherwise. Additionally, unless otherwise specified, it is to be understood that discussion of a particular feature of component extending in or along a given direction or the like does not mean that the feature or component follows a straight line or axis in such a direction or that it only extends in such direction or on such a plane without other directional components or deviations, unless otherwise specified.

Referring to FIGS. 1-11, reference numeral 10 generally designates a trailer backup assist system for controlling a backing path of a trailer 12 attached to a vehicle 14 by allowing a driver of the vehicle 14 to specify a desired curvature 26 of the backing path of the trailer 12. In one embodiment, the trailer backup assist system 10 automatically steers the vehicle 14 to guide the trailer 12 on the desired curvature or backing path 26 as a driver uses the accelerator and brake pedals to control the reversing speed of the vehicle 14. The system 10 further includes a controller 28 having a vehicle speed detector 58 and coupled with the brake module 72 of the vehicle 14 and the throttle module included in a powertrain control system 74 of vehicle 14. Generally, controller 28 implements a backup mode including determining a threshold speed and monitoring the vehicle speed and selectively outputting an initial brake torque demand determined to maintain the vehicle speed below the threshold speed. The controller 28 further applies a rate-limiting operator to the initial brake torque demand to derive a rate-limited brake torque demand for output to the brake system.

With respect to the general operation of the trailer backup assist system 10, as illustrated in the system diagram of FIG. 1, a steering input device 18 may be provided, such as a rotatable knob 30 (also shown in FIGS. 6 and 7), for a driver to provide the desired curvature 26 (FIG. 7) of the trailer 12. As such, the steering input device 18 may be operable between a plurality of selections, such as successive rotated positions of a knob 30, that each provide an incremental change to the desired curvature 26 of the trailer 12. With reference to the embodiment of the trailer backup assist system 10 shown in FIG. 1, the trailer backup assist system 10 receives vehicle and trailer status-related information from various sensors and devices. This information includes positioning information from a positioning device 56, which may include a global positioning system (GPS) on the vehicle 14 or a handled device, to determine a coordinate location of the vehicle 14 and the trailer 12 based on the location of the positioning device 56 with respect to the trailer 12 and/or the vehicle 14. The positioning device 56 may additionally or alternatively include a dead reckoning system for determining the coordinate location of the vehicle 14 and the trailer 12 within a localized coordinate system based at least on vehicle speed, steering angle, and hitch angle γ. Other vehicle information received by the trailer backup assist system 10 may include a speed of the vehicle 14 from a speed sensor 58 and a yaw rate of the vehicle 14 from a yaw rate sensor 60. It is contemplated that in additional embodiments, a hitch angle sensor 44 and other vehicle sensors and devices may provide sensor signals or other information, such as successive images of the trailer 12, that the controller of the trailer backup assist system 10 may process with various routines to determine an indicator of the hitch angle γ, such as a range of hitch angles.

As further shown in FIG. 1, one embodiment of the trailer backup assist system 10 is in communication with a power assist steering system 62 of the vehicle 14 to operate the steered wheels of the vehicle 14 for moving the vehicle 14 in such a manner that the trailer 12 reacts in accordance with the desired curvature 26 of the trailer 12. In the illustrated embodiment, the power assist steering system 62 is an electric power-assisted steering ("EPAS") system that includes an electric steering motor 66 for turning the steered wheels 64 to a steering angle based on a steering command, whereby the steering angle may be sensed by a steering angle sensor 67 of the power assist steering system 62. The steering command may be provided by the trailer backup assist system 10 for autonomously steering during a backup maneuver and may alternatively be provided manually via a rotational position (e.g., steering wheel angle) of a steering wheel of vehicle 14. However, in the illustrated embodiment, the steering wheel 68 of the vehicle 14 is mechanically coupled with the steered wheels 64 of the vehicle 14, such that the steering wheel 68 moves in concert with steered wheels 64, preventing manual intervention with the steering wheel 68 during autonomous steering. More specifically, a torque sensor 70 is provided on the power assist steering system 62 that senses torque on the steering wheel 68 that is not expected from autonomous control of the steering wheel 68 and therefore indicative of manual intervention, whereby the trailer backup assist system 10 may alert the driver to discontinue manual intervention with the steering wheel 68 and/or discontinue autonomous steering.

In alternative embodiments, some vehicles have a power assist steering system 62 that allows a steering wheel 68 to be partially decoupled from movement of the steered wheels 64 of such a vehicle. Accordingly, the steering wheel 68 can be rotated independent of the manner in which the power assist steering system 62 of the vehicle controls the steered wheels 64 (e.g., autonomous steering as commanded by the trailer backup assist system 10). As such, in these types of vehicles where the steering wheel 68 can be selectively decoupled from the steered wheels 64 to allow independent operation thereof, the steering wheel 68 may be used as a steering input device 18 for the trailer backup assist system 10, as disclosed in greater detail herein.

With continued reference to FIG. 1, the power assist steering system 62 provides the controller 28 of the trailer backup assist system 10 with information relating to a rotational position of steered wheels 64 of the vehicle 14, including a steering angle. The controller 28 in the illustrated embodiment processes the current steering angle, in addition to other vehicle 14 and trailer 12 conditions to guide the trailer 12 along the desired curvature 26. It is conceivable that the trailer backup assist system 10, in additional embodiments, may be an integrated component of the power assist steering system 62. For example, the power assist steering system 62 may include a trailer backup assist algorithm for generating vehicle steering information and commands as a function of all or a portion of information received from the steering input device 18, the hitch angle sensor 44, the power assist steering system 62, a vehicle brake control system 72, a powertrain control system 74, and other vehicle sensors and devices.

As also illustrated in FIG. 1, the vehicle brake control system 72 may also communicate with the controller 28 to provide the trailer backup assist system 10 with braking information, such as vehicle wheel speed, and to receive braking commands from the controller 28. For instance, vehicle speed information can be determined from individual wheel speeds as monitored by the brake control system 72. Vehicle speed may also be determined from the powertrain control system 74, the speed sensor 58, and the positioning device 56, among other conceivable means. In some embodiments, individual wheel speeds can also be used to determine a vehicle yaw rate, which can be provided to the trailer backup assist system 10 in the alternative or in addition to the vehicle yaw rate sensor 60. The trailer backup assist system 10 can, further, provide vehicle braking information to the brake control system 72 for allowing the trailer backup assist system 10 to control braking of the vehicle 14 during backing of the trailer 12. For example, the trailer backup assist system 10 in some embodiments may regulate speed of the vehicle 14 during backing of the trailer 12, which can reduce the potential for unacceptable trailer backup conditions, as described further below. Examples of unacceptable trailer backup conditions include, but are not limited to, a vehicle 14 over-speed condition, a high hitch angle rate, trailer angle dynamic instability, a calculated theoretical trailer jackknife condition (defined by a maximum vehicle steering angle, drawbar length, tow vehicle wheelbase, and an effective trailer length), or physical contact jackknife limitation (defined by an angular displacement limit relative to the vehicle 14 and the trailer 12), and the like, as also described further below. It is disclosed herein that the trailer backup assist system 10 can issue an alert signal corresponding to a notification of an actual, impending, and/or anticipated unacceptable trailer backup condition.

The powertrain control system 74, as shown in the embodiment illustrated in FIG. 1, may also interact with the trailer backup assist system 10 for regulating speed and acceleration of the vehicle 14 during backing of the trailer 12. As mentioned above, regulation of the speed of the vehicle 14 may be necessary to limit the potential for unacceptable trailer backup conditions such as, for example, jackknifing and trailer angle dynamic instability. Similar to high-speed considerations as they relate to unacceptable trailer backup conditions, high acceleration and high dynamic driver curvature requests can also lead to such unacceptable trailer backup conditions.

With continued reference to FIG. 1, the trailer backup assist system 10 in the illustrated embodiment may communicate with one or more devices, including a vehicle alert system 76, which may prompt visual, auditory, and tactile warnings. For instance, vehicle brake lights 78 and vehicle emergency flashers may provide a visual alert and a vehicle horn 79 and/or speaker 81 may provide an audible alert. Additionally, the trailer backup assist system 10 and/or vehicle alert system 76 may communicate with a human machine interface (HMI) 80 for the vehicle 14. The HMI 80 may include a vehicle display 82, such as a center-stack mounted navigation or entertainment display (FIG. 1). Further, the trailer backup assist system 10 may communicate via wireless communication with another embodiment of the HMI 80, such as with one or more handheld or portable devices, including one or more smartphones. The portable device may also include the display 82 for displaying one or more images and other information to a user. For instance, the portable device may display one or more images of the trailer 12 and an indication of the estimated hitch angle on the display 82. In addition, the portable device may provide feedback information, such as visual, audible, and tactile alerts.

As further illustrated in FIG. 1, the trailer backup assist system 10 includes a steering input device 18 that is connected to the controller 28 for allowing communication of information therebetween. It is disclosed herein that the steering input device 18 can be coupled to the controller 28 in a wired or wireless manner. The steering input device 18 provides the trailer backup assist system 10 with information defining the desired backing path of travel of the trailer 12 for the controller 28 to process and generate steering commands. More specifically, the steering input device 18 may provide a selection or positional information that correlates with a desired curvature 26 of the desired backing path of travel of the trailer 12. Also, the trailer steering commands provided by the steering input device 18 can include information relating to a commanded change in the path of travel, such as an incremental change in the desired curvature 26, and information relating to an indication that the trailer 12 is to travel along a path defined by a longitudinal centerline axis of the trailer 12, such as a desired curvature value of zero that defines a substantially straight path of travel for the trailer. As will be discussed below in more detail, the steering input device 18 according to one embodiment may include a movable control input device for allowing a driver of the vehicle 14 to command desired trailer steering actions or otherwise select and alter a desired curvature. For instance, the moveable control input device may be a rotatable knob 30, which can be rotatable about a rotational axis extending through a top surface or face of the knob 30. In other embodiments, the rotatable knob 30 may be rotatable about a rotational axis extending substantially parallel to a top surface or face of the rotatable knob 30. Furthermore, the steering input device 18, according to additional embodiments, may include alternative devices for providing a desired curvature 26 or other information defining a desired backing path, such as a joystick, a keypad, a series of depressible buttons or switches, a sliding input device, various user interfaces on a touch-screen display, a vision based system for receiving gestures, a control interface on a portable device, and other conceivable input devices as generally understood by one having ordinary skill in the art. It is contemplated that the steering input device 18 may also function as an input device for other features, such as providing inputs for other vehicle features or systems.

Figure 2:
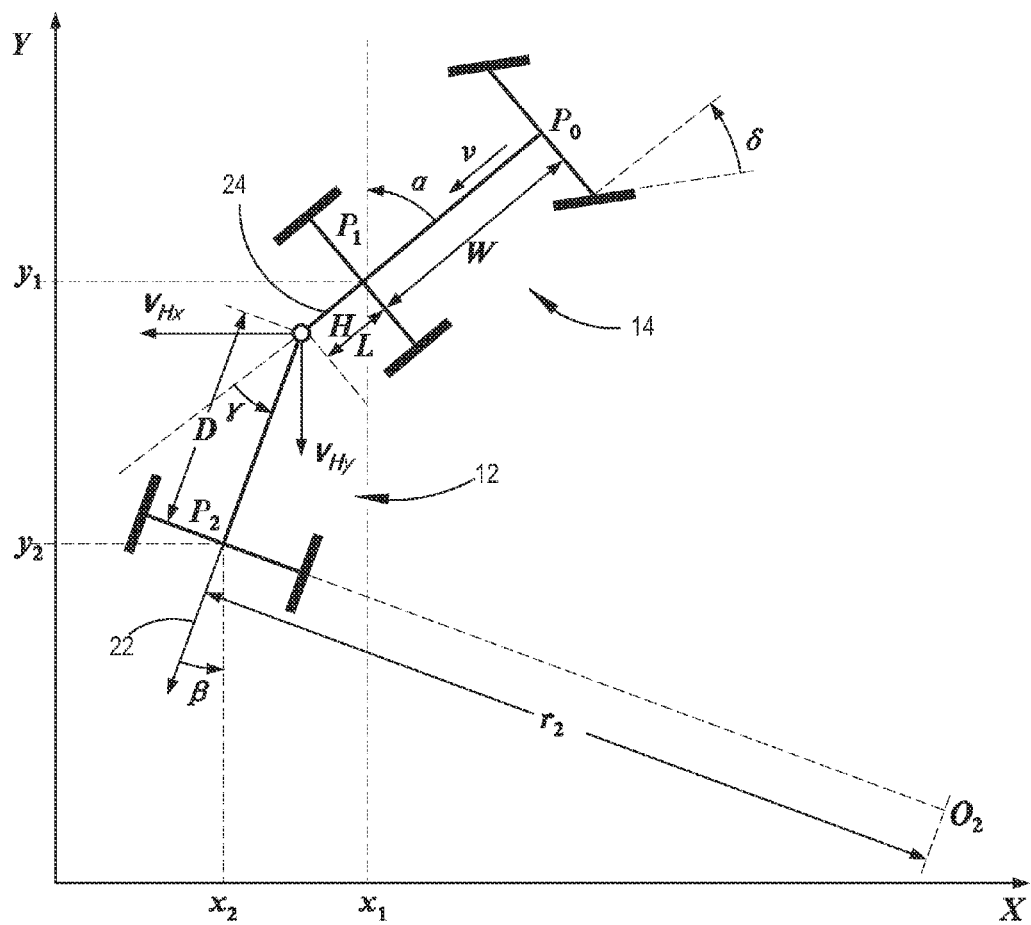
FIG. 2 is a schematic diagram that illustrates the geometry of a vehicle and a trailer overlaid with a two-dimensional x-y coordinate system, identifying variables used to determine a kinematic relationship of the vehicle and the trailer for the trailer backup assist system, according to one embodiment.

Still referring to the embodiment shown in FIG. 2, the controller 28 is configured with a microprocessor 84 to process logic and routines stored in memory 86 that receive information from the sensor system 16, including the trailer sensor module 20, the hitch angle sensor 44, the steering input device 18, the power assist steering system 62, the vehicle brake control system 72, the trailer braking system, the powertrain control system 74, and other vehicle sensors and devices. The controller 28 may generate vehicle steering information and commands as a function of all or a portion of the information received. Thereafter, the vehicle steering information and commands may be provided to the power assist steering system 62 for affecting steering of the vehicle 14 to achieve a commanded path of travel for the trailer 12. The controller 28 may include the microprocessor 84 and/or other analog and/or digital circuitry for processing one or more routines. Also, the controller 28 may include the memory 86 for storing one or more routines, including a hitch angle estimation routine 130, an operating routine 132, and a curvature routine 98. It should be appreciated that the controller 28 may be a stand-alone dedicated controller or may be a shared controller integrated with other control functions, such as integrated with the sensor system 16, the power assist steering system 62, and other conceivable onboard or off-board vehicle control systems.

With reference to FIG. 2, we now turn to a discussion of vehicle and trailer information and parameters used to calculate a kinematic relationship between a curvature of a path of travel of the trailer 12 and the steering angle of the vehicle 14 towing the trailer 12, which can be desirable for a trailer backup assist system 10 configured in accordance with some embodiments, including for use by a curvature routine 98 of the controller 28 in one embodiment. To achieve such a kinematic relationship, certain assumptions may be made with regard to parameters associated with the vehicle/trailer system. Examples of such assumptions include, but are not limited to, the trailer 12 being backed by the vehicle 14 at a relatively low speed, wheels of the vehicle 14 and the trailer 12 having negligible (e.g., no) slip, tires of the vehicle 14 having negligible (e.g., no) lateral compliance, tires of the vehicle 14 and the trailer 12 having negligible (e.g., no) deformation, actuator dynamics of the vehicle 14 being negligible, and the vehicle 14 and the trailer 12 exhibiting negligible (e.g., no) roll or pitch motions, among other conceivable factors with the potential to have an effect on controlling the trailer 12 with the vehicle 14.

As shown in FIG. 2, for a system defined by a vehicle 14 and a trailer 12, the kinematic relationship is based on various parameters associated with the vehicle 14 and the trailer 12. These parameters include:

δ: steering angle at steered front wheels of the vehicle;
α: yaw angle of the vehicle;
β: yaw angle of the trailer;
γ: hitch angle (γ=β−α);
W: wheel base of the vehicle;
L: drawbar length between hitch point and rear axle of the vehicle;
D: distance (trailer length) between hitch point and axle of the trailer or effective axle for a multiple axle trailer; and
$r_2$: curvature radius for the trailer.

In one example, a kinematic relationship between trailer path radius of curvature $r_2$ at the midpoint of an axle of the trailer 12, steering angle δ of the steered wheels 64 of the vehicle 14, and the hitch angle γ can be expressed in the equation provided below. As such, if the hitch angle γ is provided, the trailer path curvature $\kappa_2$ can be controlled based on regulating the steering angle δ (where $\dot\beta$ is trailer yaw rate and $\dot\eta$ is trailer velocity).

$$\kappa_2 = \frac{1}{r_2} = \frac{\dot\beta}{\dot\eta} = \frac{\left(W + \frac{KV^2}{g}\right)\sin\gamma + L\cos\gamma\tan\delta}{D\left(\left(W + \frac{KV^2}{g}\right)\cos\gamma - L\sin\gamma\tan\delta\right)}$$

This relationship can be expressed to provide the steering angle δ as a function of trailer path curvature $\kappa_2$ and hitch angle γ.

$$\delta = \tan^{-1}\left(\frac{\left(W + \frac{KV^2}{g}\right)[\kappa_2 D\cos\gamma - \sin\gamma]}{DL\kappa_2\sin\gamma + L\cos\gamma}\right) = F(\gamma, \kappa_2, K)$$

Accordingly, for a particular vehicle and trailer combination, certain parameters (e.g., D, W and L) of the kinematic relationship are constant and assumed known. V is the vehicle longitudinal speed and g is the acceleration due to gravity. K is a speed dependent parameter which when set to zero makes the calculation of steering angle independent of vehicle speed. For example, vehicle-specific parameters of the kinematic relationship can be predefined in an electronic control system of the vehicle 14 and trailer-specific parameters of the kinematic relationship can be inputted by a driver of the vehicle 14, determined from sensed trailer behavior in response to vehicle steering commands, or otherwise determined from signals provided by the trailer 12. Trailer path curvature $\kappa_2$ can be determined from the driver input via the steering input device 18. Through the use of the equation for providing steering angle, a corresponding steering command can be generated by the curvature routine 98 for controlling the power assist steering system 62 of the vehicle 14.

Additionally, an assumption may be made by the curvature routine 98 that a longitudinal distance L between the pivoting connection and the rear axle of the vehicle 14 is equal to zero for purposes of operating the trailer backup assist system 10 when a gooseneck trailer or other similar trailer is connected with the a hitch ball or a fifth wheel connector located over a rear axle of the vehicle 14. The assumption essentially assumes that the pivoting connection with the trailer 12 is substantially vertically aligned with the rear axle of the vehicle 14. When such an assumption is made, the controller 28 may generate the steering angle command for the vehicle 14 as a function independent of the longitudinal distance L between the pivoting connection and the rear axle of the vehicle 14. It is appreciated that the gooseneck trailer mentioned generally refers to the tongue configuration being elevated to attach with the vehicle 14 at an elevated location over the rear axle, such as within a bed of a truck, whereby embodiments of the gooseneck trailer may include flatbed cargo areas, enclosed cargo areas, campers, cattle trailers, horse trailers, lowboy trailers, and other conceivable trailers with such a tongue configuration.

Figure 3:
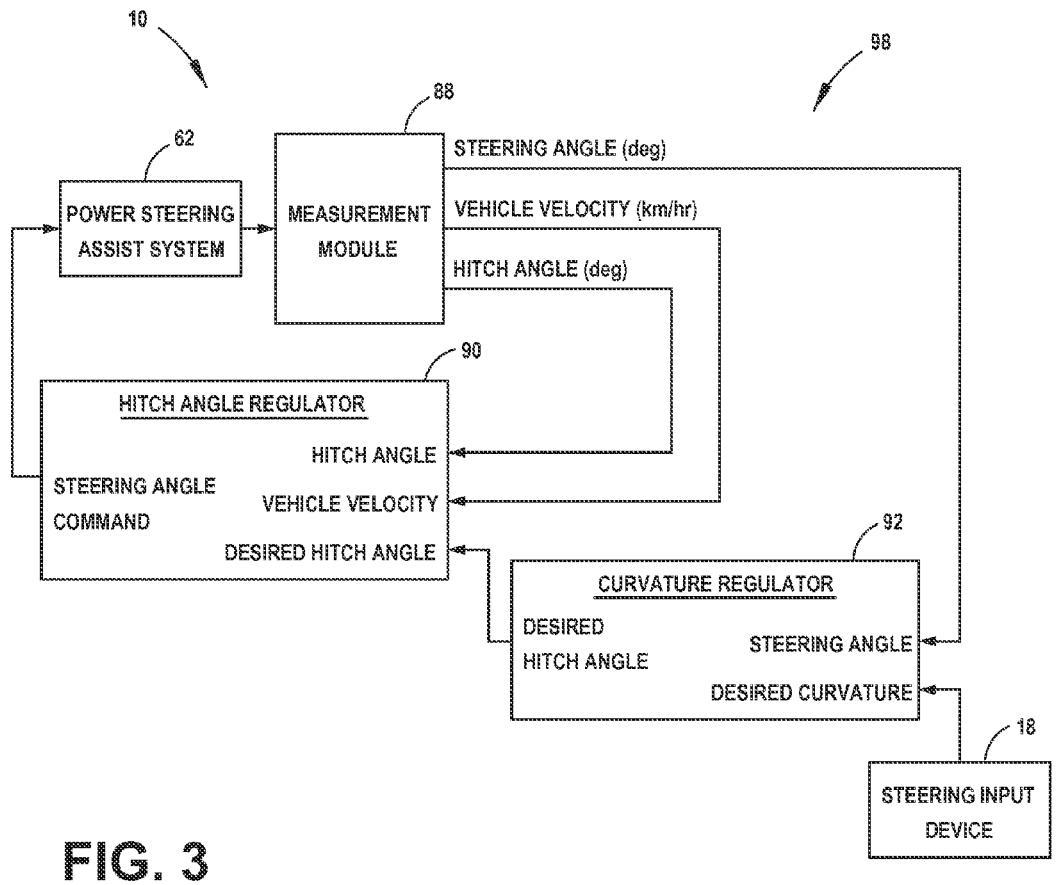
FIG. 3 is a schematic block diagram illustrating portions of a curvature controller, according to an additional embodiment, and other components of the trailer backup assist system, according to such an embodiment.

Yet another example of the curvature routine 98 of the trailer backup assist system 10 is illustrated in FIG. 3, showing the general architectural layout whereby a measurement module 88, a hitch angle regulator 90, and a curvature regulator 92 are routines that may be stored in the memory 86 of the controller 28. In the illustrated layout, the steering input device 18 provides a desired curvature $\kappa_2$ value to the curvature regulator 92 of the controller 28, which may be determined from the desired backing path 26 that is input with the steering input device 18. The curvature regulator 92 computes a desired hitch angle γ(d) based on the current desired curvature $\kappa_2$ along with the steering angle δ provided by a measurement module 88 in this embodiment of the controller 28. The measurement module 88 may be a memory device separate from or integrated with the controller 28 that stores data from sensors of the trailer backup assist system 10, such as the hitch angle sensor 44, the vehicle speed sensor 58, the steering angle sensor 67, or alternatively the measurement module 88 may otherwise directly transmit data from the sensors without functioning as a memory device. Once the desired hitch angle γ(d) is computed by the curvature regulator 92 the hitch angle regulator 90 generates a steering angle command based on the computed desired hitch angle γ(d) as well as a measured or otherwise estimated hitch angle γ(m) and a current velocity of the vehicle 14. The steering angle command is supplied to the power assist steering system 62 of the vehicle 14, which is then fed back to the measurement module 88 to reassess the impacts of other vehicle characteristics impacted from the implementation of the steering angle command or other changes to the system. Accordingly, the curvature regulator 92 and the hitch angle regulator 90 continually process information from the measurement module 88 to provide accurate steering angle commands that place the trailer 12 on the desired curvature $\kappa_2$ and the desired backing path 26, without substantial overshoot or continuous oscillation of the path of travel about the desired curvature $\kappa_2$.

Figure 4:
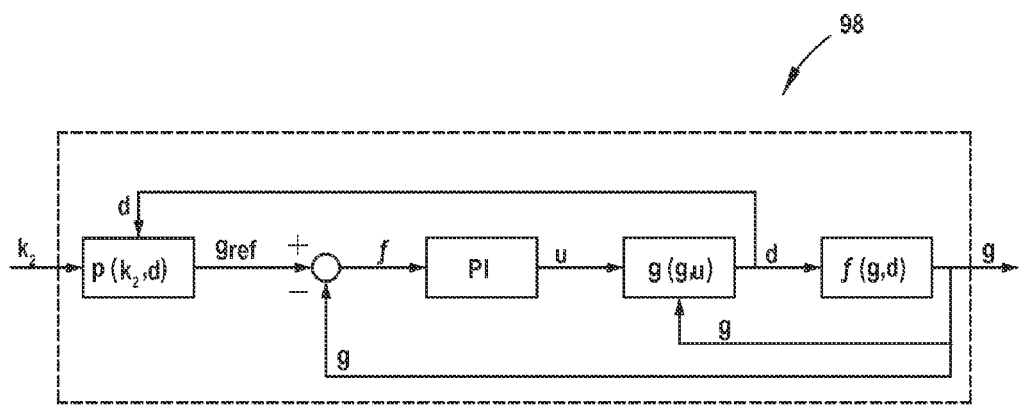
FIG. 4 is schematic block diagram of the curvature controller of FIG. 4, showing the feedback architecture and signal flow of the curvature controller, according to such an embodiment.

As also shown in FIG. 4, the curvature routine 98 shown in FIG. 3 is illustrated in a control system block diagram. Specifically, entering the control system is an input, $\kappa_2$, which represents the desired curvature 26 of the trailer 12 that is provided to the curvature regulator 92. The curvature regulator 92 can be expressed as a static map, p($\kappa_2$, δ), which in one embodiment is the following equation:

$$p(\kappa_2, \delta) = \tan^{-1}\left(\frac{\kappa_2 D + L\tan(\delta)}{\kappa_2 DL\tan(\delta) - W}\right)$$

Where, $\kappa_2$ represents the desired curvature of the trailer 12 or $1/r_2$ as shown in FIG. 3;

$\delta$ represents the steering angle;

L represents the distance from the rear axle of the vehicle 14 to the hitch pivot point;

D represents the distance from the hitch pivot point to the axle of the trailer 12; and W represents the distance from the rear axle to the front axle of the vehicle 14.

Figure 5:
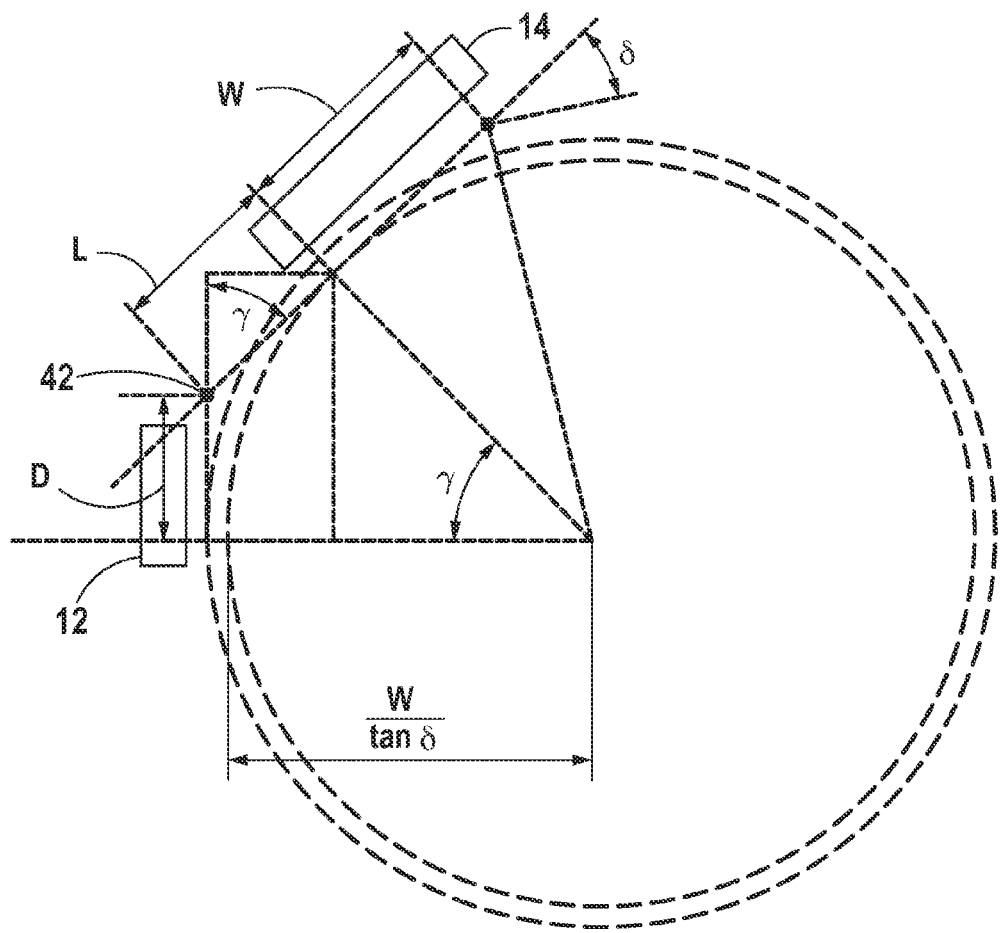
FIG. 5 is a schematic diagram showing a relationship between a hitch angle and a steering angle of the vehicle as it relates to curvature of the trailer and a jackknife angle.

With further reference to FIG. 5, the output hitch angle of $p(\kappa_2, \delta)$ is provided as the reference signal, $\gamma_{ref}$, for the remainder of the control system, although the steering angle $\delta$ value used by the curvature regulator 92 is feedback from the non-linear function of the hitch angle regulator 90. It is shown that the hitch angle regulator 90 uses feedback linearization for defining a feedback control law, as follows:

$$g(u, \gamma, v) = \delta = \tan^{-1}\left(\frac{W}{v\left(1 + \frac{L}{D}\cos(\gamma)\right)}\left(u - \frac{v}{D}\sin(\gamma)\right)\right)$$

As also shown in FIG. 5, the feedback control law, $g(u, \gamma, v)$, is implemented with a proportional integral (PI) controller, whereby the integral portion substantially eliminates steady-state tracking error. More specifically, the control system illustrated in FIG. 4 may be expressed as the following differential-algebraic equations:

$$\dot{\gamma}(t) = \frac{v(t)}{D}\sin(\gamma(t)) + \left(1 + \frac{L}{D}\cos(\gamma(t))\right)\frac{v(t)}{W}\overline{\delta}$$

$$\tan(\delta) = \overline{\delta} = \frac{W}{v(t)\left(1 + \frac{L}{D}\cos(\gamma(t))\right)}\left(K_P(p(\kappa_2, \delta) - \gamma(t)) - \frac{v(t)}{D}\sin(\gamma(t))\right)$$

It is contemplated that the PI controller may have gain terms based on trailer length D since shorter trailers will generally have faster dynamics. In addition, the hitch angle regulator 90 may be configured to prevent the desired hitch angle $\gamma(d)$ to reach or exceed a jackknife angle $\gamma(j)$, as computed by the controller or otherwise determined by the trailer backup assist system 10, as disclosed in greater detail herein.

Referring now to FIG. 5, in the illustrated embodiments of the disclosed subject matter, it is desirable to limit the potential for the vehicle 14 and the trailer 12 to attain a jackknife angle (i.e., the vehicle/trailer system achieving a jackknife condition). A jackknife angle $\gamma(j)$ refers to a hitch angle $\gamma$ that while backing cannot be overcome by the maximum steering input for a vehicle such as, for example, the steered front wheels of the vehicle 14 being moved to a maximum steered angle $\delta$ at a maximum rate of steering angle change. The jackknife angle $\gamma(j)$ is a function of a maximum wheel angle for the steered wheels of the vehicle 14, the wheel base W of the vehicle 14, the distance L between hitch point and the rear axle of the vehicle 14, and the trailer length D between the hitch point and the axle of the trailer 12 or the effective axle when the trailer 12 has multiple axles. When the hitch angle $\gamma$ for the vehicle 14 and the trailer 12 achieves or exceeds the jackknife angle $\gamma(j)$, the vehicle 14 may be pulled forward to reduce the hitch angle $\gamma$. Thus, for limiting the potential for a vehicle/trailer system attaining a jackknife angle, it is preferable to control the yaw angle of the trailer 12 while keeping the hitch angle $\gamma$ of the vehicle/trailer system relatively small.

A kinematic model representation of the vehicle 14 and the trailer 12 can also be used to determine a jackknife angle for the vehicle-trailer combination. Accordingly, with reference to FIGS. 2 and 5, a steering angle limit for the steered front wheels requires that the hitch angle $\gamma$ cannot exceed the jackknife angle $\gamma(j)$, which is also referred to as a critical hitch angle $\gamma$. Thus, under the limitation that the hitch angle $\gamma$ cannot exceed the jackknife angle $\gamma(j)$, the jackknife angle $\gamma(j)$ is the hitch angle $\gamma$ that maintains a circular motion for the vehicle/trailer system when the steered wheels 64 are at a maximum steering angle $\delta(max)$. The steering angle for circular motion with hitch angle $\gamma$ is defined by the following equation.

$$\tan\delta_{max} = \frac{w\sin\gamma_{max}}{D + L\cos\gamma_{max}}$$

Solving the above equation for hitch angle $\gamma$ allows jackknife angle $\gamma(j)$ to be determined. This solution, which is shown in the following equation, can be used in implementing trailer backup assist functionality in accordance with the disclosed subject matter for monitoring hitch angle $\gamma$ in relation to jackknife angle.

$$\cos\overline{\gamma} = \frac{-b \pm \sqrt{b^2 - 4ac}}{2a}$$

where, $a = L^2 \tan^2 \delta (max) + W^2$;

$b = 2 LD \tan^2 \delta (max)$; and $c = D^2 \tan^2 \delta (max) - W^2$.

In certain instances of backing the trailer 12, a jackknife enabling condition can arise based on current operating parameters of the vehicle 14 in combination with a corresponding hitch angle $\gamma$. This condition can be indicated when one or more specified vehicle operating thresholds are met while a particular hitch angle $\gamma$ is present. For example, although the particular hitch angle $\gamma$ is not currently at the jackknife angle for the vehicle 14 and attached trailer 12, certain vehicle operating parameters can lead to a rapid (e.g., uncontrolled) transition of the hitch angle $\gamma$ to the jackknife angle for a current commanded trailer curvature and/or can reduce an ability to steer the trailer 12 away from the jackknife angle. One reason for a jackknife enabling condition is that trailer curvature control mechanisms (e.g., those in accordance with the disclosed subject matter) generally calculate steering commands at an instantaneous point in time during backing of a trailer 12. However, these calculations will typically not account for lag in the steering control system of the vehicle 14 (e.g., lag in a steering EPAS controller). Another reason for the jackknife enabling condition is that trailer curvature control mechanisms generally exhibit reduced steering sensitivity and/or effectiveness when the vehicle 14 is at relatively high speeds and/or when undergoing relatively high acceleration.

Jackknife determining information may be received by the controller 28, according to one embodiment, to process and characterize a jackknife enabling condition of the vehicle-trailer combination at a particular point in time (e.g., at the point in time when the jackknife determining information was sampled). Examples of the jackknife determining information include, but are not limited to, information characterizing an estimated hitch angle γ, information characterizing a vehicle accelerator pedal transient state, information characterizing a speed of the vehicle 14, information characterizing longitudinal acceleration of the vehicle 14, information characterizing a brake torque being applied by a brake system 72 of the vehicle 14, information characterizing a powertrain torque being applied to driven wheels of the vehicle 14, and information characterizing the magnitude and rate of driver requested trailer curvature. In this regard, jackknife determining information would be continually monitored, such as by an electronic control unit (ECU) that carries out trailer backup assist (TBA) functionality. After receiving the jackknife determining information, a routine may process the jackknife determining information for determining if the vehicle-trailer combination attained the jackknife enabling condition at the particular point in time. The objective of the operation for assessing the jackknife determining information is determining if a jackknife enabling condition has been attained at the point in time defined by the jackknife determining information. If it is determined that a jackknife enabling condition is present at the particular point in time, a routine may also determine an applicable countermeasure or countermeasures to implement. Accordingly, in some embodiments, an applicable countermeasure will be selected dependent upon a parameter identified as being a key influencer of the jackknife enabling condition. However, in other embodiments, an applicable countermeasure will be selected as being most able to readily alleviate the jackknife enabling condition. In still another embodiment, a predefined countermeasure or predefined set of countermeasures may be the applicable countermeasure(s).

As previously disclosed with reference to the illustrated embodiments, during operation of the trailer backup assist system 10, a driver of the vehicle 14 may be limited in the manner in which steering inputs may be made with the steering wheel 68 of the vehicle 14 due to the power assist steering system 62 being directly coupled to the steering wheel 68. Accordingly, the steering input device 18 of the trailer backup assist system 10 may be used for inputting a desired curvature 26 of the trailer 12, thereby decoupling such commands from being made at the steering wheel 68 of the vehicle 14. However, additional embodiments of the trailer backup assist system 10 may have the capability to selectively decouple the steering wheel 68 from movement of steerable wheels of the vehicle 14, thereby allowing the steering wheel 68 to be used for commanding changes in the desired curvature 26 of a trailer 12 or otherwise selecting a desired backing path during such trailer backup assist.

Figure 6:
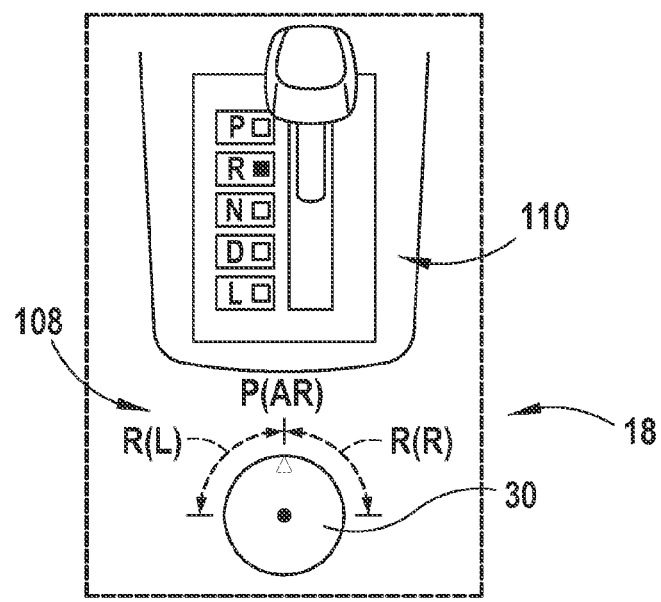
FIG. 6 is a plan view of a steering input device having a rotatable knob for operating the trailer backup assist system, according to one embodiment.

Referring now to FIG. 6, one embodiment of the steering input device 18 is illustrated disposed on a center console 108 of the vehicle 14 proximate a shifter 110. In this embodiment, the steering input device 18 includes a rotatable knob 30 for providing the controller 28 with the desired backing path of the trailer 12. More specifically, the angular position of the rotatable knob 30 may correlate with a desired curvature, such that rotation of the knob to a different angular position provides a different desired curvature with an incremental change based on the amount of rotation and, in some embodiments, a normalized rate, as described in greater detail herein.

Figure 7:
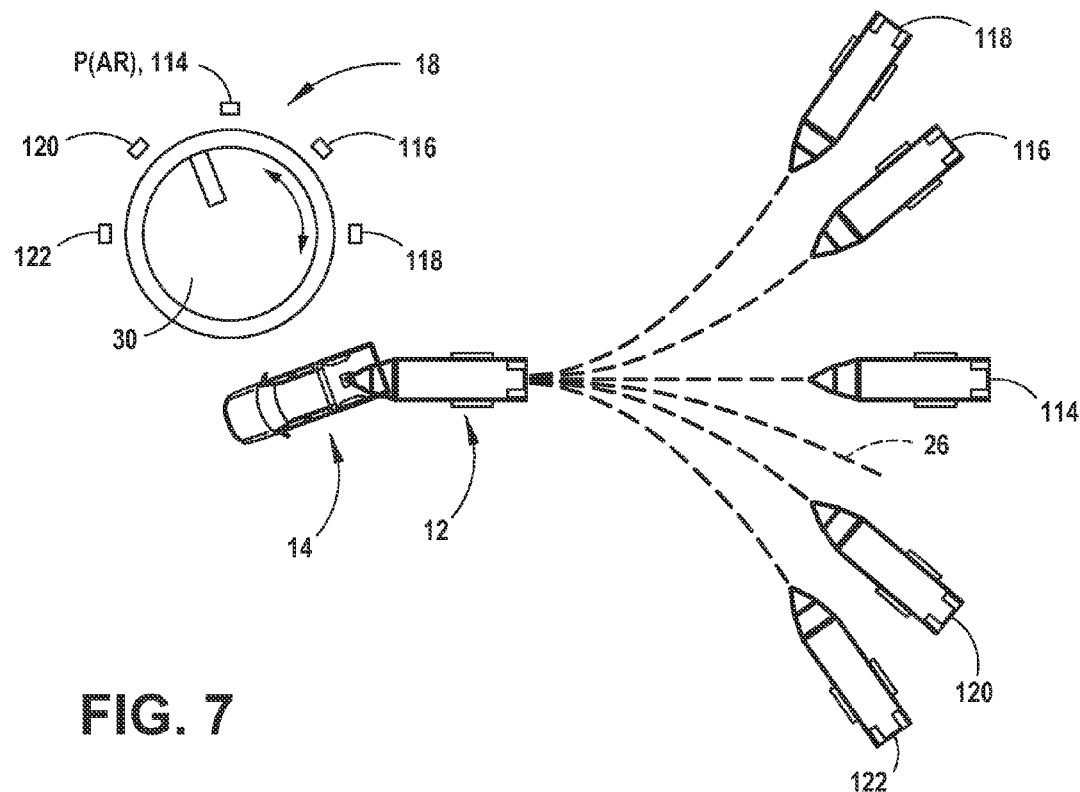
FIG. 7 is a plan view of another embodiment of a rotatable knob for selecting a desired curvature of a trailer and a corresponding schematic diagram illustrating a vehicle and a trailer with various trailer curvature paths correlating with desired curvatures that may be selected.

The rotatable knob 30, as illustrated in FIGS. 6 and 7, may be biased (e.g., by a spring return) to a center or at-rest position P(AR) between opposing rotational ranges of motion R(R), R(L). In the illustrated embodiment, a first one of the opposing rotational ranges of motion R(R) is substantially equal to a second one of the opposing rotational ranges of motion R(L), R(R). To provide a tactile indication of an amount of rotation of the rotatable knob 30, a force that biases the knob toward the at-rest position P(AR) can increase (e.g., non-linearly) as a function of the amount of rotation of the rotatable knob 30 with respect to the at-rest position P(AR). Additionally, the rotatable knob 30 can be configured with position indicating detents such that the driver can positively feel the at-rest position P(AR) and feel the ends of the opposing rotational ranges of motion R(L), R(R) approaching (e.g., soft end stops). The rotatable knob 30 may generate a desired curvature value as function of an amount of rotation of the rotatable knob 30 with respect to the at-rest position P(AR) and a direction of movement of the rotatable knob 30 with respect to the at-rest position P(AR). It is also contemplated that the rate of rotation of the rotatable knob 30 may also be used to determine the desired curvature output to the controller 28. The at-rest position P(AR) of the knob corresponds to a signal indicating that the vehicle 14 should be steered such that the trailer 12 is backed along a substantially straight backing path (zero trailer curvature request from the driver), as defined by the longitudinal direction 22 of the trailer 12 when the knob was returned to the at-rest position P(AR). A maximum clockwise and anti-clockwise position of the knob (i.e., limits of the opposing rotational ranges of motion R(R), R(L)) may each correspond to a respective signal indicating a tightest radius of curvature (i.e., most acute trajectory or smallest radius of curvature) of a path of travel of the trailer 12 that is possible without the corresponding vehicle steering information causing a jackknife condition.

As shown in FIG. 7, a driver can turn the rotatable knob 30 to provide a desired curvature 26 while the driver of the vehicle 14 backs the trailer 12. In the illustrated embodiment, the rotatable knob 30 rotates about a central axis between a center or middle position 114 corresponding to a substantially straight backing path 26 of travel, as defined by the longitudinal direction 22 of the trailer 12, and various rotated positions 116, 118, 120, 122 on opposing sides of the middle position 114, commanding a desired curvature 26 corresponding to a radius of the desired backing path of travel for the trailer 12 at the commanded rotated position. It is contemplated that the rotatable knob 30 may be configured in accordance with embodiments of the disclosed subject matter and omit a means for being biased to an at-rest position P(AR) between opposing rotational ranges of motion. Lack of such biasing may allow a current rotational position of the rotatable knob 30 to be maintained until the rotational control input device is manually moved to a different position. It is also conceivable that the steering input device 18 may include a non-rotational control device that may be configured to selectively provide a desired curvature 26 and to override or supplement an existing curvature value. Examples of such a non-rotational control input device include, but are not limited to, a plurality of depressible buttons (e.g., curve left, curve right, and travel straight), a touch screen on which a driver traces or otherwise inputs a curvature for path of travel commands, a button that is translatable along an axis for allowing a driver to input backing path commands, or a joystick type input and the like.

Figure 8:
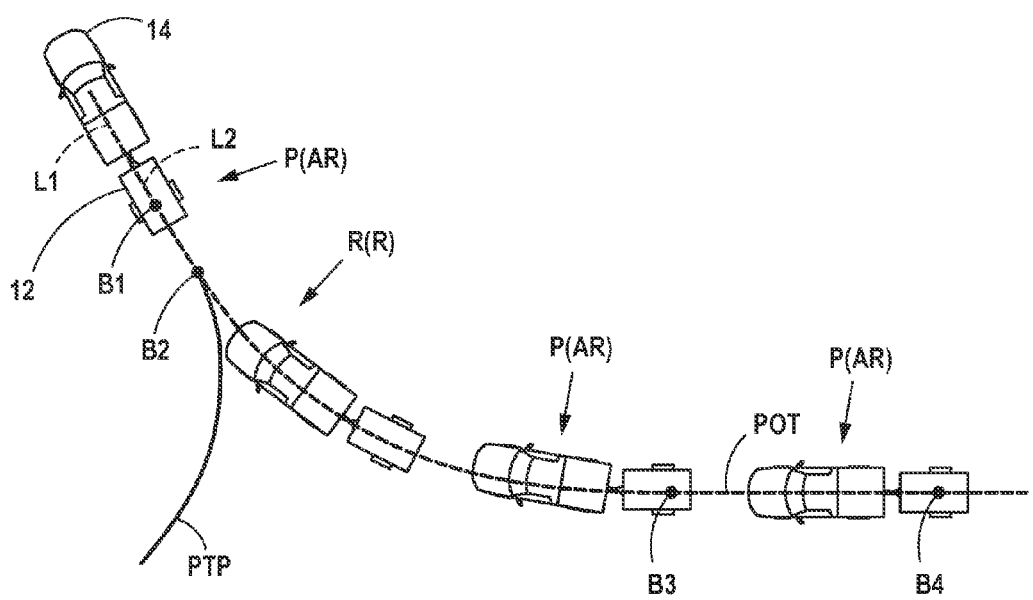
FIG. 8 is a schematic diagram showing a backup sequence of a vehicle and a trailer implementing various curvature selections with the trailer backup assist system, according to one embodiment.

Referring to FIG. 8, an example of using the steering input device 18 for dictating a curvature of a desired backing path of travel (POT) of the trailer 12 while backing up the trailer 12 with the vehicle 14 is shown. In preparation of backing the trailer 12, the driver of the vehicle 14 may drive the vehicle 14 forward along a pull-through path (PTP) to position the vehicle 14 and trailer 12 at a first backup position B1. In the first backup position B1, the vehicle 14 and trailer 12 are longitudinally aligned with each other such that a longitudinal centerline axis L1 of the vehicle 14 is aligned with (e.g., parallel with or coincidental with) a longitudinal centerline axis L2 of the trailer 12. It is disclosed herein that such alignment of the longitudinal axis L1, L2 at the onset of an instance of trailer backup functionality is not a requirement for operability of a trailer backup assist system 10, but may be done for calibration.

After activating the trailer backup assist system 10 (e.g., before, after, or during the pull-thru sequence), the driver begins to back the trailer 12 by reversing the vehicle 14 from the first backup position B1. So long as the rotatable knob 30 of the trailer backup steering input device 18 remains in the at-rest position P(AR) and no other steering input devices 18 are activated, the trailer backup assist system 10 will steer the vehicle 14 as necessary for causing the trailer 12 to be backed along a substantially straight path of travel, as defined by the longitudinal direction 22 of the trailer 12, specifically the centerline axis L2 of the trailer 12, at the time when backing of the trailer 12 began. When the trailer 12 reaches the second backup position B2, the driver rotates the rotatable knob 30 to command the trailer 12 to be steered to the right (i.e., a knob position R(R) clockwise rotation). Accordingly, the trailer backup assist system 10 will steer the vehicle 14 for causing the trailer 12 to be steered to the right as a function of an amount of rotation of the rotatable knob 30 with respect to the at-rest position P(AR), a rate movement of the knob, and/or a direction of movement of the knob with respect to the at-rest position P(AR). Similarly, the trailer 12 can be commanded to steer to the left by rotating the rotatable knob 30 to the left. When the trailer 12 reaches backup position B3, the driver allows the rotatable knob 30 to return to the at-rest position P(AR) thereby causing the trailer backup assist system 10 to steer the vehicle 14 as necessary for causing the trailer 12 to be backed along a substantially straight path of travel as defined by the longitudinal centerline axis L2 of the trailer 12 at the time when the rotatable knob 30 was returned to the at-rest position P(AR). Thereafter, the trailer backup assist system 10 steers the vehicle 14 as necessary for causing the trailer 12 to be backed along this substantially straight path to the fourth backup position B4. In this regard, arcuate portions of a path of travel POT of the trailer 12 are dictated by rotation of the rotatable knob 30 and straight portions of the path of travel POT are dictated by an orientation of the centerline longitudinal axis L2 of the trailer 12 when the knob 30 is in/returned to the at-rest position P(AR).

In the embodiment illustrated in FIG. 8, in order to activate the trailer backup assist system 10, the driver interacts with the trailer backup assist system 10 and the automatically steers as the driver reverses the vehicle 14. As discussed above, the driver may command the trailer backing path by using a steering input device 18 and the controller 28 may determine the vehicle steering angle to achieve the desired curvature 26, whereby the driver controls the throttle and brake while the trailer backup assist system 10 controls the steering.

Figure 9:
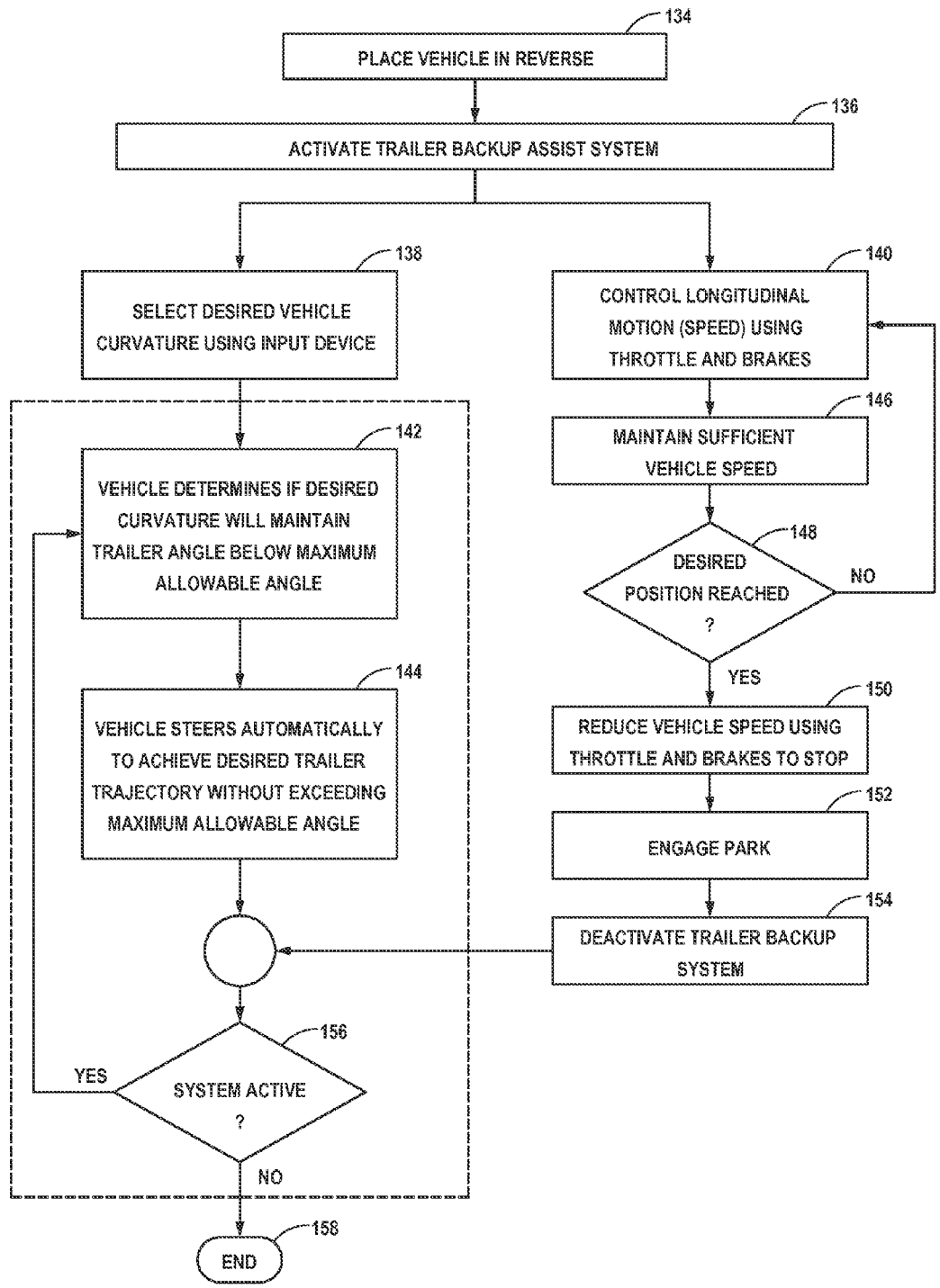
FIG. 9 is a flow diagram illustrating a method of operating a trailer backup assist system using an operating routine for steering a vehicle reversing a trailer with normalized control of the desired curvature, according to one embodiment.

With reference to FIG. 9, a method of operating one embodiment of the trailer backup assist system 10 is illustrated and includes both actions carried out by the driver of vehicle 14 as well as by system 10, which is shown, generally, as one embodiment of the operating routine 132 (FIG. 1). At step 134, the method is initiated by the driver placing the vehicle in reverse (such as after traversing the pull-through path (PTP) shown in FIG. 8) and, subsequently activating the trailer backup assist system 10. It is contemplated that this may be done in a variety of ways, such a making a selection on the display 82 of the vehicle HMI 80. Once system 10 is activated, the driver, in step 138, selects the desired vehicle curvature using an input device, such as knob 30, as discussed above with respect to FIGS. 6 and 7, above, while simultaneously controlling the longitudinal motion (i.e. speed) of vehicle 14 using the powertrain control system 74 and brake control system 72 in step 140. In general, system 10 executes operating routine 132 to determine if the desired curvature can be safely executed in step 142, which, in an embodiment, may mean that the desired curvature will maintain the hitch angle γ below jackknife angle γ(j), for example. As discussed further below, system 10 causes vehicle 14 to steer automatically, such as by control of EPAS system 62, to implement either the desired curvature or a modified curvature determined to be appropriate for preventing a jackknife condition, which may be determined according to the process described above with respect to FIG. 5.

As mentioned, while system 10 is causing vehicle 14 to automatically steer to maintain an appropriate curvature, the driver maintains the general responsibility for controlling the longitudinal motion of vehicle 14 using the powertrain control system 74 and brake control system 72 (FIG. 1). Initially, doing so causes vehicle 14 to begin rearward motion. As vehicle 14 accelerates, it is generally the responsibility of the driver to maintain sufficient vehicle speed in step 146 until the desired position is reached (step 148) based on the curvature along which system 10 steers vehicle 14. Upon vehicle 14 reaching the desired location, the driver slows vehicle 14 by reducing throttle position and applying brake torque in step 150 before placing vehicle 14 in park and deactivating system 10, at which point system 10 relinquishes control of EPAS 62 (step 150) and the process ends in step 152.

As noted above, however, the speed at which vehicle 14 travels while system 10 executes operating routine 132 can affect the ability of system 10 to avoid a jackknife condition or other adverse condition. In particular, at higher vehicle speeds, the dynamics of the yaw rate of trailer 12 with respect to that of vehicle 14 and, accordingly, hitch angle γ may occur at a rate that is too fast for system 10 to react to avoid a hitch angle γ increasing to or beyond jackknife angle γ(j), as explained above. Accordingly, as discussed above, it may be desirable for system 10 to be able to determine if the speed of vehicle 14 is at or is approaching a threshold at which system 10 may be unable to reliably control hitch angle γ and to act to slow vehicle 14, if necessary. As system 10 is configured such that the driver maintains general control over the speed of vehicle 14 while routine 132 is being carried out, further intervention by system 10 in the form of warning the driver of an overspeed condition or, if necessary, deactivating system 10 itself may be desirable.

Figure 10:
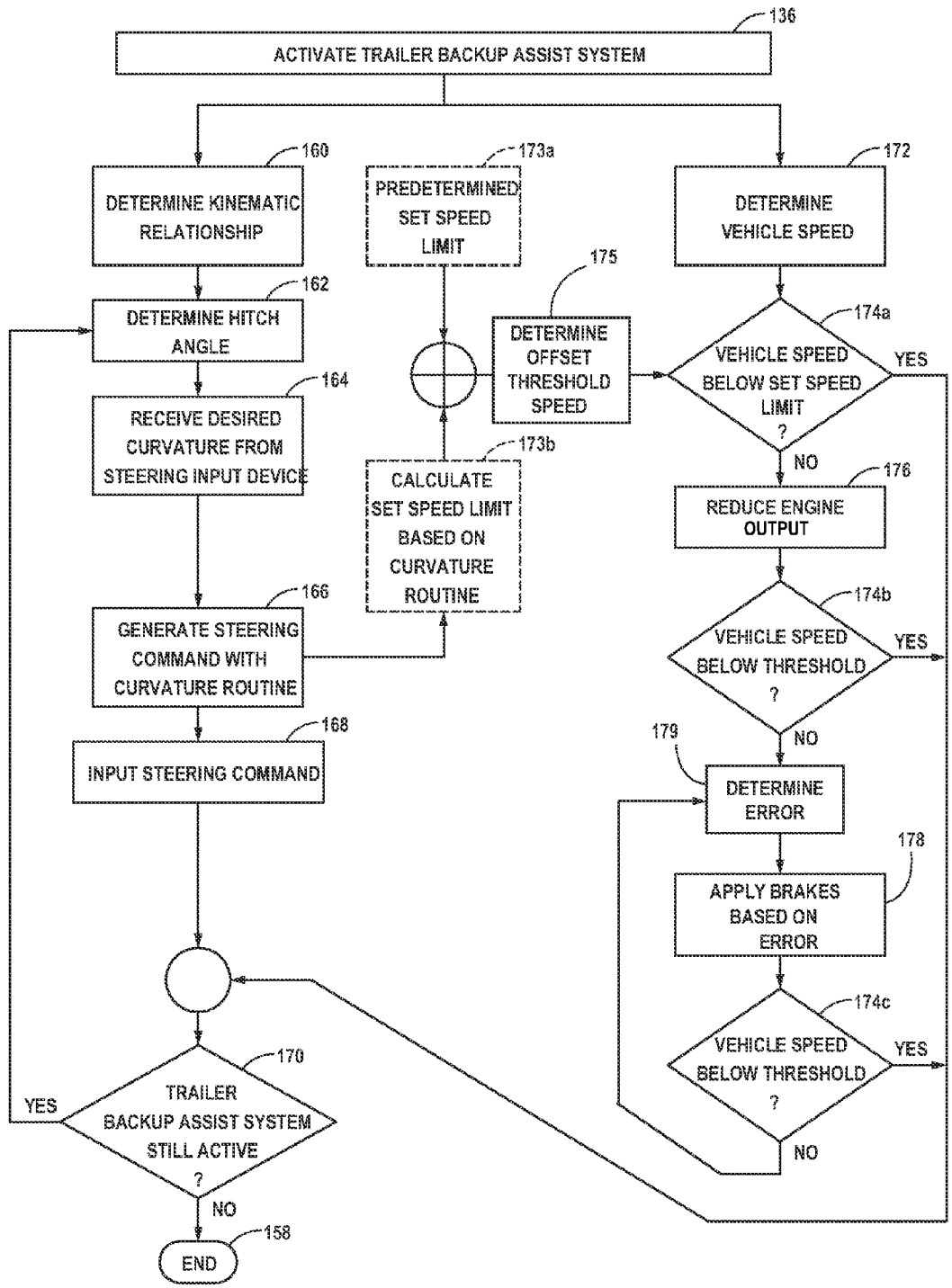
FIG. 10 is a flow diagram illustrating further aspects of the method of operating a trailer backup assist system, including implementing a speed reduction and warning process.

With reference to FIG. 10, an embodiment of system 10 is illustrated schematically, in which system 10 is configured to monitor the speed of vehicle 14 into take various actions in response to a vehicle speed above a threshold level sufficient, for example, to allow system 10 to maintain hitch angle γ below jackknife angle γ(j). The general scheme illustrated in FIG. 10 and carried out by system 10 can be implemented in the operational scheme depicted in FIG. 9, for example, and begins, generally, when system 10 is activated in step 136. In step 136, system 10 begins the process to steer vehicle 14 along the desired curvature, as described above, in step 160 by determining the kinematic relationship between the trailer 12 and vehicle 14 to which trailer 12 is attached.

To determine the kinematic relationship in step 162, various parameters of the vehicle 14 and the trailer 12 are sensed, input by the driver, or otherwise determined for the trailer backup assist system 10 to generate steering commands to the power assist steering system 62 in accordance with the desired curvature or backing path 26 of the trailer 12. As disclosed with reference to FIGS. 2-5, the kinematic parameters to define the kinematic relationship include a length D of the trailer 12, a wheel base W of the vehicle 14, and a distance L from a hitch connection to a rear axle of the vehicle 14 and a hitch angle γ between the vehicle 14 and the trailer 12, among other variables and parameters as previously described. Accordingly, after the kinematic relationship is determined, the trailer backup assist system 10 may proceed at step 162 to determine a current hitch angle γ by receiving input from a sensor 44 (FIG. 1) or by executing a hitch angle estimation routine 130 carried out by system 10 using yaw rate sensor 25 of trailer 12, yaw rate sensor 60 of vehicle 14, among other inputs related to the kinematic relationship, and as described further in copending, commonly-assigned U.S. patent application Ser. No. 14/512,859, now U.S. Pat. No. 9,340,228, the disclosure of which is incorporated by reference herein in its entirety. Subsequently, the desired curvature $\kappa_2$ is received from steering input device 18 in step 164, which is processed based on the kinematic relationship and hitch angle γ in step 166 to generate a steering command such as by using curvature routine 98 as described above with respect to FIGS. 3 and 4. Subsequently, system 10 can implement the steering command in step 168 with appropriate output to power assist steering system 62. System 10 can continue to repeat steps 162-168 as long trailer backup assist system 10 remains active (step 170).

While system 10 continues to monitor hitch angle and steering input device 18 to generate and implement an appropriate steering command in steps 162-168, system 10 can simultaneously monitor to determine vehicle speed in step 172, which can be done using speed sensor 58. System 10 can then compare the vehicle speed to a set speed limit to determine if intervention is desired. As discussed above, the set speed limit can be a speed at which system 10 is capable of generating and implementing a steering command to prevent hitch angle γ from approaching jackknife angle γ(j) at an uncontrollable rate, which may be influenced by, among other things, the speed of the processor 84, the responsiveness of power assist steering system 62, and in particular electric steering motor 66, as well as length D of trailer 12. As illustrated in FIG. 10, the set speed limit can be predetermined and stored in step 173A for access by system 10 in carrying out a comparison of vehicle speed to the set speed limit in, for example, step 174A. The predetermined set speed limit can be derived or estimated based on the parameters just mentioned, while conservatively estimating for a short trailer length D, as a shorter trailer 12 will converge more rapidly toward jackknife angle γ(j). Alternatively, a number of predetermined set speed limits can be stored in memory 82 and referenced based on trailer length D. Alternatively, a specific set speed limit can be calculated in step 173 by system 10 based on the parameters of vehicle 14 and system 10 as previously described, as well as additional factors related to determination of a jackknife enabling condition, as described above with respect to FIG. 5. Further, in step 175 an offset can be added to the set speed limit to derive a threshold speed that can be used in subsequent operations to take further action to lower the speed of vehicle 14, if necessary. In an example, a 1 mile per hour ("MPH") offset can be added to the set speed limit so that the threshold speed is 1 MPH higher than the set speed limit. Other preset values can be used for the offset or, alternatively, the offset can also be calculated as a function of vehicle 14 and system 10 parameters, as discussed above, including parameters affecting a potential jackknife condition.

Accordingly, system 10 can compare the vehicle speed determined in step 172 with either a predetermined or calculated set speed limit (steps 173A or 173B) in step 174A. If the vehicle speed is below the set speed limit, system 10 may continue without intervention. If the vehicle speed is above the set speed limit, system 10 may take action to reduce vehicle speed. In an example, such intervention can include causing powertrain control system 74 to reduce engine output in step 176, which can be done by adjusting the throttle position to decrease the output below that which is being demanded by the position of the accelerator pedal, as directed by the driver. In another example, system 10 can communicate the set speed limit to powertrain control system 74 and powertrain control system 74 can itself continuously adjust the demanded powertrain output to attempt to maintain vehicle 14 speed at or below the set speed limit, including in an anticipatory manner. In either example, system 10 can then monitor the vehicle speed to determine if the action carried out in step 176 is sufficient to maintain the speed of vehicle 14 to below the threshold speed in step 174B. If, at such a point, the vehicle speed is still below the threshold speed system 10 can return to check if the intervention in step 176 was sufficient to reduce the vehicle speed to below the set speed limit by returning to step 174a. If the speed has not yet been sufficiently reduced, system 10 can continue to cause powertrain control system 74 to operate at a reduced throttle position so long as needed to effectively reduce vehicle speed to below the set speed limit, at which point normal operation may resume, including by allowing powertrain control system 74 to resume normal operation. If, after reducing engine output in step 176 system 10 determines that vehicle speed has continued to increase to the point of being above the threshold speed, system 10 can cause vehicle brake control system 72 to actuate the vehicle brakes, thereby applying a brake torque to vehicle 14 in step 178 to further attempt to slow vehicle speed to below the threshold speed. In particular, system 10, as described further below, can be configured to determine a speed error between the vehicle speed and the threshold speed in step 179 and to apply the vehicle brakes in step 178 in a manner that is proportional to the determined error in both the total brake torque demand and in the speed at which brake control system 72 increases the brake torque to the total brake torque demand (i.e. the ramp up speed). The manner in which system 10 provides such a control scheme is discussed further below. In step 174c, system 10 continues to monitor the vehicle speed to determine if it is below the threshold speed or if continued intervention is needed, at which point system 10 continues use of the speed error in deriving a control for brake control system 72. It is noted that the use of the threshold speed in determining if application of the vehicle brakes is needed can allow time to see if system 10 can reduce the vehicle speed to below the set speed limit by reducing throttle alone.

System 10 can continue to cause vehicle 14 to operate at a reduced engine output and with brakes applied as long as necessary to effectively maintain vehicle speed below threshold speed. Similarly, system 10 can stop demanding brake torque application, and can restore engine output if it has been determined that no further intervention is required. In further embodiments, system 10 may take additional action, including the presentation of warnings or the deactivation of operating routine 132, as described further in co-pending, commonly assigned U.S. patent application Ser. No. 14/678,025, now U.S. Pat. No. 9,623,859, the entire disclosure of which is hereby incorporated by reference herein.

Figure 11:
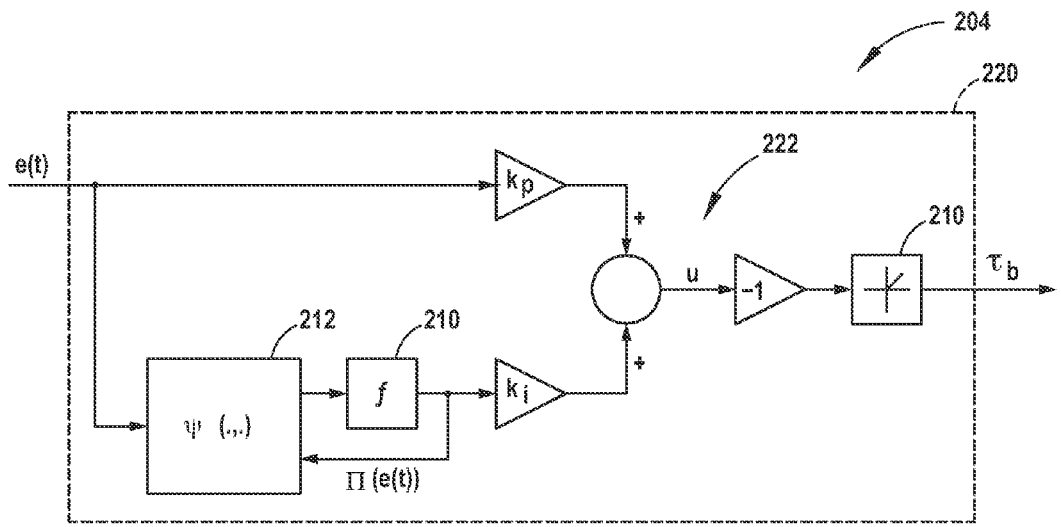
FIG. 11 is a block diagram of a non-linear proportional-integral controller that can be used to control the speed of a vehicle during a trailer backup assist operation.
Figure 12:
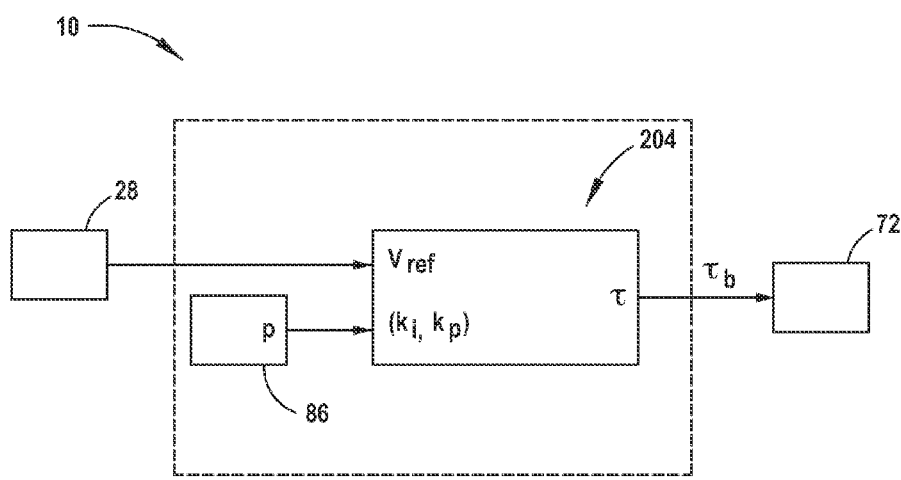
FIG. 12 is a block diagram showing the interaction of the controller of FIG. 11 with other systems in the vehicle.

Turning now to FIGS. 11 and 12, an example of a controller 204 is described that may be incorporated into an embodiment of system 10 to further the ability of system 10 to maintain a vehicle speed less than or equal to an upper speed bound or limit, such as one of the predetermined or calculated set speed limits or corresponding threshold speed described above. Controller 204 may further have the ability to alter such a bound or limit (e.g. by updating the parameters and related calculation used to obtain the calculated set speed limit in step 173B in FIG. 10) to change, in real-time, to meet various feature use cases of system 10. The structure of controller 204 may provide asymptotic tracking and disturbance rejection with respect to road grade and model uncertainty. Various embodiments of controller 204, as described further below may allow system 10 to either operate such that the driver is not the primary means for maintaining speed control or such that system 10 may effectively intervene during user speed control, if necessary to avoid an overspeed condition. Embodiments of system 10 incorporating a controller 204 as described herein may also be able to reject disturbances from environmental noise factors including road grade variations, variations in road surfaces and engine idle conditions.

In an example, controller 204 may be able to determine a road grade and generate an appropriate brake-apply signal in response thereto, if needed, in a manner describe in co-pending, commonly assigned U.S. patent application Ser. No. 14/682,204, now U.S. Pat. No. 9,744,972, the entire disclosure of which is hereby incorporated by reference herein. In the embodiment illustrated in FIG. 12, controller 204 tracks an inequality rather than strictly minimizing the error signal. Accordingly, rather than using set-valued feedback, controller 204 uses a modified proportional-integral ("PI") feedback scheme to maintain the speed of vehicle 14 below the reference speed throughout disturbances that can include engine idle, torque and gravity when vehicle 14 is on an inclined road. The reference velocity may be stored in memory 86 of system 10 in an example and may be adjusted by controller 204, depending on, for example the hitch angle γ, including a lowering of the reference velocity if hitch angle γ is determined to be approaching jackknife angle γ(j). Because the speed limiting provided by controller 204 involves articulation of an actuator that can only affect the dynamics in a single direction, namely to slow the vehicle 14 down, controller 204 includes an optimizer to minimize $\|v_{ref}(t) - v(t)\|$ if $\tau_b \neq 0$, where $\tau_b$ is the output brake torque. In this sense, controller 204 does not attempt to slow the vehicle 14 down unless the speed of vehicle 14 gets sufficiently close to the reference velocity $v_{ref}$ or $v_{ref}(t)$.

Accordingly, a feedback-based scheme is used for controller 204 with various nonlinear modifications. The controller 204 generates the control signal u(t), uses the reference signal $v_{ref}(t)$, and uses the feedback measurement v(t) with the error signal be defined as $e(t) := v_{ref} - v(t)$. An asymmetric saturation block is endowed on the output of the controller as:

$$\tau_b = \max\{-u(t), 0\}.$$

This implies the controller 204 does not request a negative torque command. Due to the challenges of the inequality tracking, an integrator within a standard PI controller may not be effective, due to the wind-up while the error signal e(t)>0. To properly define the nonlinear integrator, the arbitrary time varying signal x(t) is considered. The logical function:

$$\psi(x(t), e(t)) = \begin{cases} e(t) & \text{if } e(t) \geq 0 \vee x(t) \leq 0 \\ 0 & \text{else} \end{cases},$$

which is used implicitly to define the integral control, denoted Π(e(t)) as:

$$\Pi(e(t)) := \int_0^t \psi(\Pi(e(\tau)), e(\tau)) d\tau.$$

The PI controller is defined with the proportional gain $K_p \geq 0$ and integral gain $K_i > 0$ recursively as:

$$u(t) = K_p e(t) + K_i \Pi(e(t)).$$

Controller 204 is illustrated in block form in FIG. 11, where the foregoing mathematical statements can be realized via the illustrated logical blocks. More specifically, in FIG. 12, the PI controller 204 is shown, including the nonlinear integrator 210. In block 212, the controller 204 defines the integral control, which is fed into nonlinear integrator 210. The blocks 220 following the control signal 222 are responsible for converting the units from deceleration to brake torque $\tau_b$, and preventing negative torque requests from being sent to the brake controller.

The generally constant presence of engine idle force, in some cases, may imply the brakes be constantly active to keep the vehicle at a generally constant speed. This idle may be problematic to deal with open-loop, because it can vary depending on atmospheric conditions and health of the engine. Therefore, the error signal will be equal to zero when the system 10 feeds a zero or positive value to block 212. The implication is that the integrator 210 is responsible for calculating a correct amount of brake torque needed to keep the vehicle velocity under the reference signal. According to the mathematical definitions of the nonlinear integrator 210 in FIG. 12, the integrator 210 is active when the input error is negative or the integrator output is or would be negative. It is further understood that the controller gains $K_p$ and $K_i$ are chosen such that the overshoot does not exceed $v_{max}$. That is, $v_{ref}(t)$ must be chosen sufficiently below $v_{max}$ such that controller 204 is able to maintain the inequality $v(t) < v_{max}$ regardless of the disturbance inputs that are applied, such as steep hills or high engine idle force.

The command interface chosen is brake torque deceleration, meaning that the actuator is not assumed to have any feedback on the vehicle dynamics, such as calculated velocity or acceleration. In one example, this implies the controller is a torque interface that will not attempt to adjust for road grade. That is, commands are sent as brake torque $\tau_b$, and, in one example, the corresponding command may be applied at the anti-lock brake ("ABS") pump. Therefore, the controller gains $K_i$ and $K_p$ may be tuned accordingly to specific vehicle platforms. In an example, the brake command may be reissued about every 20 milliseconds over the controller area network ("CAN"). The controller 204 is shown incorporated into system 10, abstractly, in FIG. 12, where controller 204 receives $v_{ref}$ from controller 28 (where it is either stored in memory 86 or is calculated during operating routing 132 or curvature routine 98), along with the stored parameters for $K_i$ and $K_p$ to derive a desired brake torque output $\tau_b$ to brake system 72.

Figure 13:
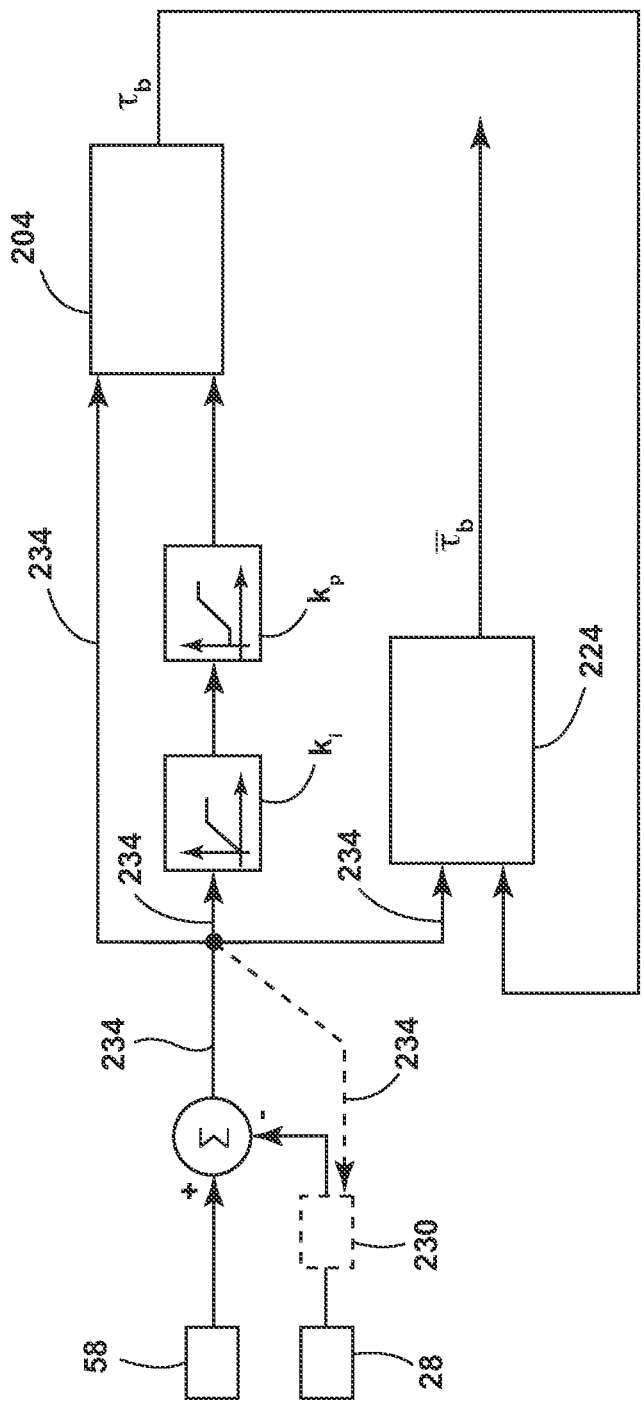
FIG. 13 is a block diagram of a rate limiter that can be used to further control the output of the controller of FIG. 11.

Various control schemes may be used in controller 204 to make the controller generate less noise, vibration, or harshness ("NVH") during normal operation while providing further ability to lower the vehicle speed quickly, should certain parameters make such action desirable. A scheme according to one embodiment is shown in FIG. 13 and includes applying a rate limit to the output of the controller brake torque command $\tau_b$. In additional embodiments, such a rate limiting scheme can be employed in connection with other speed limiting or speed control schemes that involve the application of brake torque in response to a detected or potential overspeed condition, alone or in combination with throttle reduction. Various examples of such schemes include adaptive cruise control, various collision mitigation systems, and the like. In one example, NVH can be controlled by limiting the degree to which the input initial torque command $\tau_b$ to brake system 72 ramps up. Therefore, a rate limiting operator may be applied to the initial torque output signal $\tau_b$, with the resultant brake torque demand or signal being denoted as $\bar{\tau}_b$. This may effectively limit how fast a brake torque command may build up (i.e. the "ramp up rate"), while still allowing it quickly to decrease, if needed. This is mathematically defined as a bound on the derivative of $\tau_b(t)$, namely let the rate limit bounds be $RL_{min}<0$ and $RL_{max}>0$, the rate limit implies:

$$RL_{min} \leq \frac{d}{dt}\tau_b(t) \leq RL_{max},$$

where the steady state output of rate limit operator block 224 is equal to the input $\tau_b$. The input-output behavior may be somewhat like a filter, except there is no frequency domain equivalent.

As further shown in FIG. 13, the system 10 can feed the speed error signal 234, calculated as discussed above in steps 179a and 179b as the difference between the vehicle speed and the threshold speed (i.e. set speed limit plus offset) when the vehicle speed is in excess of the threshold speed, into the rate limit operator 224. This can allow the rate limit operator 224 to take into account the value or significance of the error in slowing or limiting the ramp-up of the brake torque demand from the initial output signal $\tau_b$ to arrive at a resultant brake torque demand $\bar{\tau}_b$. In particular, the rate limit operator 224 can provide a comparatively greater influence in slowing ramp up of the brake torque demand when the error is relatively low, while allowing faster ramp up (i.e. by reducing the effect of the rate limit operator 224) when the error is high, thereby allowing system 10 to bring the vehicle speed down through increasing brake torque demand $\bar{\tau}_b$ as rapidly as possible at the sacrifice of NVH. In one example, the effect of the rate limit operator can vary continuously as a function of the error signal 234, such as linearly or according to another, higher order function with appropriate constants. In other embodiments, the effect of the rate limit operator 224 may vary according to zones, including by being able to operate to limit brake torque ramp up more significantly within a low error zone (e.g. less than one MPH to about 2 MPH) while having a reduced, or zero, effect when the speed error signal 234 is higher (e.g. above 2 MPH) with additional intermediate zones being possible. In a similar alternative embodiment the rate limit effectiveness may be derived based on values included in a look-up table stored in memory 86, for example.

In a similar manner, controller 204 may be configured to take into account the amplitude of the vehicle speed error 234 in deriving the initial brake torque demand $\tau_b$. As further illustrated in FIG. 13, the vehicle speed error 234 may be fed into controller 204 to be used, as discussed above to derive the initial brake torque demand according to the nonlinear PI scheme illustrate in FIGS. 11 and 12. As shown in FIG. 13, the proportional and integral gains $K_p$ and $K_i$ used by controller 204 can also be adjusted according to the speed error signal 234. In particular, gains $K_p$ and $K_i$ can be relatively lower (but still within an appropriate range, as discussed above) at low speed error to help achieve smooth speed transitions that may be less noticeable by the user. By increasing gains $K_p$ and $K_i$ at high speed error, the system may induce more aggressive braking by providing a higher resulting initial brake torque demand $\tau_b$. This higher initial brake torque demand, including when combined with a corresponding reduced rate limiting effect, may help mitigate automatic termination of curvature routine 98 due to a prolonged overspeed condition while operating on steeper grades with a truck and trailer at maximum loading condition, which may cause a faster, more significant, overspeed condition and, accordingly a higher speed error signal 234. As discussed above with respect to the effect of rate limit operator 224, gains $K_p$ and $K_i$ may be changed based on zones of speed error 234, a lookup table, a linear function of speed error 234, or some other higher order function thereof.

As can be understood, both the road grade on which vehicle 14 is traveling, as well as the mass of the trailer 12 being reversed, can affect the ability of system 10 to slow vehicle 14 when reversing trailer 12 in a speed error condition, which can itself lead to an increase in both the initial brake torque request and the rate-limited brake torque request over time. However, as discussed above, it may be advantageous for system 10 to react, under certain conditions, to a speed error condition by applying an appropriately-high level of brake torque demand as quickly as possible to prevent system 10 deactivation (which may be a built-in feature of system 10 as described in co-pending, commonly-assigned U.S. patent application Ser. No. 14/678,025, now U.S. Pat. No. 9,623,859, the entire disclosure of which is incorporated herein by reference). Accordingly, in a similar manner to the adjustment of the rate-limit operator 224 and of control gains $K_p$ and $K_i$, can also take into account the road grade and/or the mass of trailer 12. In particular, the gains $K_p$ and $K_i$ may be set as a function of road grade and/or mass such that when the vehicle is driven in a direction of zero or increasing grade, the gains will be set a lower level. When the vehicle is driven in a direction of decreasing grade (i.e. reversing downhill) or is towing a trailer 12 of a relatively higher mass (e.g. approaching the towable limit of vehicle 14), the gains will be set at a higher level. The grade information may be determined from a global positioning service ("GPS") topographical database, measured directly or inferred from inertial sensors within vehicle 14 or in a smart device, or estimated using powertrain torque and vehicle speed measurements. In one example, the road grade beneath trailer can be determined according to the process discussed in co-pending, commonly-assigned U.S. patent application Ser. No. 14/682,204, now U.S. Pat. No. 9,744,972, the entire disclosure of which is incorporated herein by reference. Similarly, the system mass may be determined using vehicle sensors such as suspension height sensors or may be calculated from the powertrain torque and available inertial sensors. The gains $K_p$ and $K_i$ may be changed based on topographical zones or a look-up table, or may be a linear function of road grade change or some other higher-order function of road grade change.

In a similar manner, the effect of rate limit operator 224 may also be set as a function of road grade such that when the vehicle is driven in a direction of zero or increasing grade, the brake torque command rate limit will be set a lower level, thereby providing a slower ramp-up of the brake torque command $\bar{\tau}_b$. When the vehicle is driven in a direction of decreasing grade, the allowable ramp-up rate will be set at a higher level, allowing faster responsiveness. The rate limit in this manner may be changed based on topographical zones, a look-up table, a linear function of road grade change, or some other higher order function of road grade change.

In a further variation or addition, the gains $K_p$ and $K_i$ may vary according to vehicle torque and vehicle speed such that when higher powertrain torques are required to accelerate a particular magnitude, the gains $K_p$ and $K_i$ will be set a lower level based on an inference that the reduction in powertrain torque in step 176 will have a higher effect on the speed of vehicle 14. Again, the gains $K_p$ and $K_i$ may be set according to values in a look-up Table or as a continuous functions of powertrain torque and vehicle speed. Similarly, the effect of rate limit operator 224 may also be set as a function of vehicle torque and vehicle speed such that when higher powertrain torques are required to accelerate a particular magnitude, the brake torque command rate limit will be set a lower level. The rate limit effectiveness may be changed according to values in a look-up table or as a continuous function of powertrain torque and vehicle speed.

Additionally, the set speed limit can also be pre-filtered with, for example, a low-pass filter 230. This arrangement may prevent the proportional part of the PI controller 204 from directly feeding through an input discontinuity to the brake end, resulting in an implementation of controller 204 that acts smoothly with slowly varying input signals, while even small discontinuities may create more "pump" NVH along with aggressive braking Various low-pass filters may provide sufficient performance in such an implementation of controller 204. In one example, a first-order low-pass filter may be used with frequency cutoff $f_c$ and can be implemented in transfer function:

$$F(s) = \frac{1}{\frac{2}{2\pi f_c} + 1}.$$

It is noted, however, that the use of such a filter may introduce a time-delay in providing a final, rate-limited brake torque demand $\bar{\tau}_b$ in accordance with the proceed discussed above. Accordingly, the filter 230 may also include a function of the speed error 234 and/or the measured or calculated road grade such that when more aggressive braking is needed (such as if the speed error 234, road grade, and/or vehicle mass has exceeded a threshold), the filter 230 may be removed or the coefficients or frequency cutoff $f_c$ may be changed to reduce the time delay in processing the filtered signal. This may be implemented as a single threshold on speed error 230, road grade, and/or vehicle 14 mass, or as a look-up table or function of any combination of these.

Figure 14:
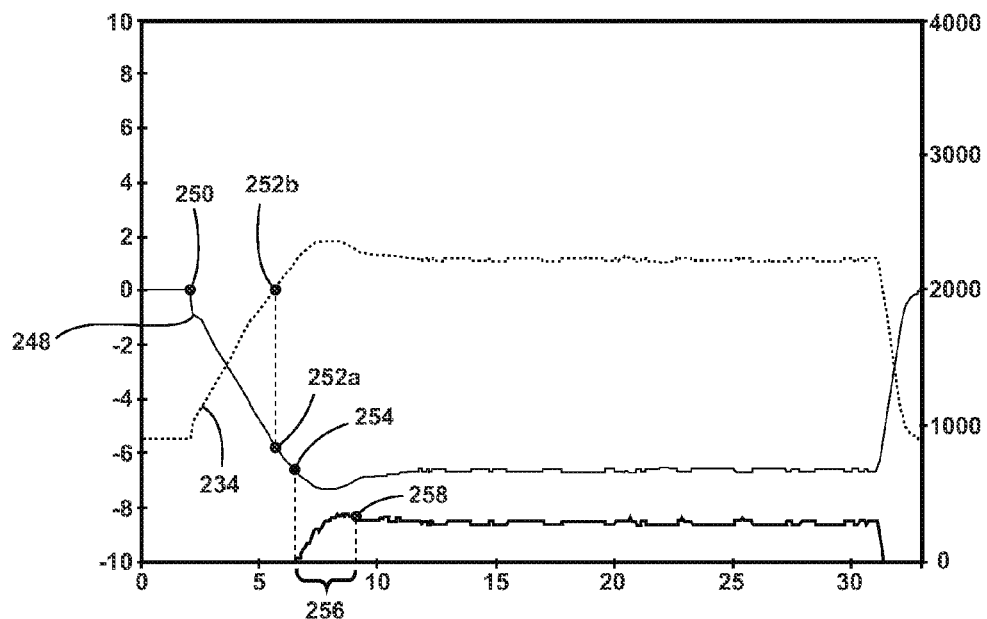
FIGS. 14 and 15 are graphical representations of the further control provided by the rate limiter of FIG. 13 under different conditions.

The effects of the above-described portion of system 10 under examples of the various conditions described above are illustrated in FIGS. 14 and 15. In particular, FIG. 14 shows the response of system 10 and, in particular controller 204 and rate-limit operator 224 in slowing the vehicle 14 and trailer 12 combination when on a generally flat road grade during straight (i.e. zero curvature command). As shown, the vehicle 14 begins accelerating in reverse at point 250 until the vehicle speed 248 reaches the set speed limit at point 252a, leading to a positive speed error 234 indicated at point 252b. At such a point, system 10 reduces the throttle demand, thus causing vehicle 14 to decelerate, such deceleration, however, not being enough to bring speed 250 below the set speed limit or to cause speed to fail to reach the threshold speed at point 254. Accordingly, the positive speed error 234 (including the speed offset) causes controller 204 to provide an initial brake torque demand under the above-described low values for the gains $K_p$ and $K_i$ as well as the lowered limit for the rate limiting operator 224, thereby providing a ramp-up period 256 to a peak torque demand $\bar{\tau}_b$ at point 258 to bring the vehicle 14 speed to below the threshold speed (at which point the speed error with the offset removed is zero).

Figure 15:
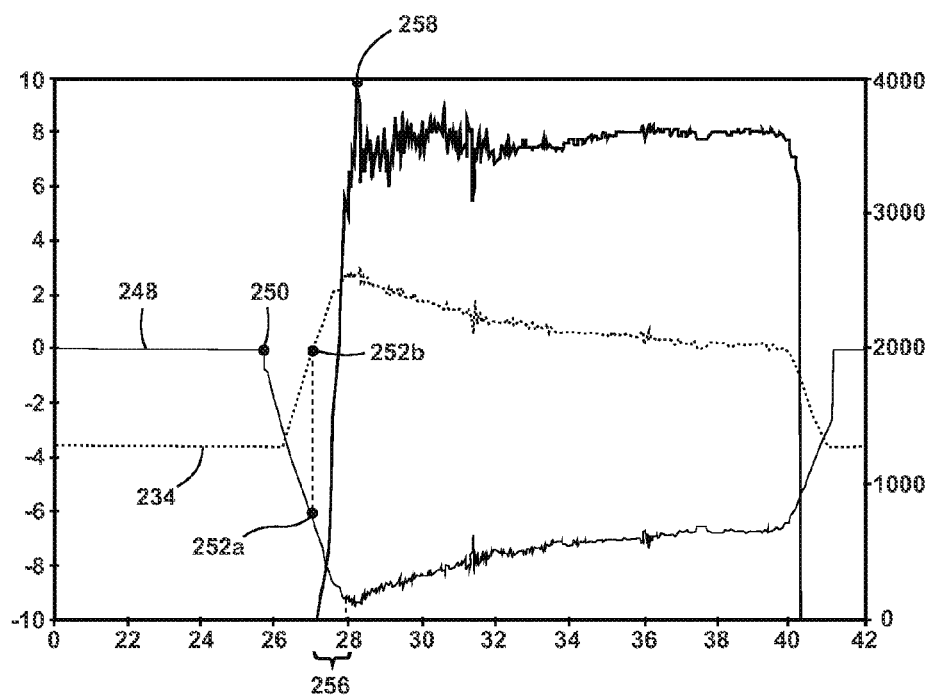

FIG. 15 shows the response of system 10 and, in particular controller 204 and rate-limit operator 224 in slowing the vehicle 14 and trailer 12 combination when on a surface with a road grade of 11% and towing a trailer 12 at or near the maximum towable limit for vehicle 14. Under these conditions, the speed offset may be lowered such that the threshold speed is about equal to the set speed limit. Further, the effect of filter 230 may be reduced as well as the effect of rate limit operator 224 (i.e. high allowable rate). Further the gains used by controller 204 may also be increased. The effects of such adjustments are shown when the vehicle 14 begins accelerating rapidly in reverse at point 250 until the vehicle speed 248 reaches the set speed limit at point 252a, leading to a positive speed error 234 indicated at point 252b. At such a point, system 10 reduces the throttle demand and immediately produces a comparatively higher brake torque demand, thus causing vehicle 14 to decelerate. Notably, the ramp-up period 256 is also comparatively shorter due to the higher rate limit. Further, the peak torque demand $\bar{\tau}_b$ at point 258 is also higher than under the conditions of FIG. 14. The torque demand $\bar{\tau}_b$ is also generally noisier during and shortly after ramp-up due to the reduction in the effect of filter 230.

It will be understood by one having ordinary skill in the art that construction of the described invention and other components is not limited to any specific material. Other exemplary embodiments of the invention disclosed herein may be formed from a wide variety of materials, unless described otherwise herein.

For purposes of this disclosure, the term "coupled" (in all of its forms, couple, coupling, coupled, etc.) generally means the joining of two components (electrical or mechanical) directly or indirectly to one another. Such joining may be stationary in nature or movable in nature. Such joining may be achieved with the two components (electrical or mechanical) and any additional intermediate members being integrally formed as a single unitary body with one another or with the two components. Such joining may be permanent in nature or may be removable or releasable in nature unless otherwise stated.

It is also important to note that the construction and arrangement of the elements of the invention as shown in the exemplary embodiments is illustrative only. Although only a few embodiments of the present innovations have been described in detail in this disclosure, those skilled in the art who review this disclosure will readily appreciate that many modifications are possible (e.g., variations in sizes, dimensions, structures, shapes and proportions of the various elements, values of parameters, mounting arrangements, use of materials, colors, orientations, etc.) without materially departing from the novel teachings and advantages of the subject matter recited. For example, elements shown as integrally formed may be constructed of multiple parts or elements shown as multiple parts may be integrally formed, the operation of the interfaces may be reversed or otherwise varied, the length or width of the structures and/or members or connector or other elements of the system may be varied, the nature or number of adjustment positions provided between the elements may be varied. It should be noted that the elements and/or assemblies of the system may be constructed from any of a wide variety of materials that provide sufficient strength or durability, in any of a wide variety of colors, textures, and combinations. Accordingly, all such modifications are intended to be included within the scope of the present innovations. Other substitutions, modifications, changes, and omissions may be made in the design, operating conditions, and arrangement of the desired and other exemplary embodiments without departing from the spirit of the present innovations.

It will be understood that any described processes or steps within described processes may be combined with other disclosed processes or steps to form structures within the scope of the present invention. The exemplary structures and processes disclosed herein are for illustrative purposes and are not to be construed as limiting.

What is claimed is:

1. A vehicle, comprising:
a speed detector detecting a vehicle speed;
a brake system;
a control system:
implementing a control mode including determining a threshold speed;
deriving an initial brake torque demand based on an error between the threshold speed and a vehicle speed exceeding the threshold speed; and
outputting to the brake system a rate-limited brake torque demand that increases at a rate based on the error from zero to the initial brake torque demand.

2. The vehicle of claim 1, further comprising a powertrain control, wherein the control system further:
determines the threshold speed as the sum of a set speed limit and a predetermined offset; and
causes the powertrain control to reduce a propulsion torque output to attempt to reduce the vehicle speed to below the set speed limit.

3. The vehicle of claim 2, wherein the offset is a constant.

4. The vehicle of claim 2, wherein the offset is determined as a function of the error.

5. The vehicle of claim 2, wherein the control system applies a filter to the set speed limit, the filter being adjusted as a function of the error.

6. The vehicle of claim 1, wherein the control system derives the rate based on the error such that the rate is faster in response to a comparatively lower error and slower in response to a comparatively higher error.

7. The vehicle of claim 6, wherein the rate-limited brake torque demand is output to the brake system by applying a rate limit operator to the initial brake torque demand, the rate corresponding with a value of the rate limit operator that is one of a continuous function of the error, based on predetermined ranges of the error, or received from a table-based lookup operator.

8. The vehicle of claim 1, wherein the control system derives the initial brake torque demand proportionally to at least one of increasing road grade, increasing trailer weight, increasing vehicle speed, and increasing torque output.

9. The vehicle of claim 1, wherein the control system further derives the rate proportionally to at least one of increasing road grade, increasing trailer weight, increasing vehicle speed, and increasing torque output.

10. The vehicle of claim 1, further comprising a steering system, wherein:
the control mode is a backup mode for reversing a trailer articulably coupled with the vehicle, the control mode further including controlling the steering system to maintain the trailer along a path.

11. A backup assist system for a vehicle reversing a trailer articulably coupled with the vehicle, comprising:
a vehicle steering module;
a vehicle brake module;
a speed detector detecting a vehicle speed; and
a controller:
outputting a steering command to the vehicle steering module to maintain the trailer along a commanded path; and
determining an excess speed error based on a detected vehicle speed and a calculated threshold speed and outputting to the vehicle brake module a torque demand that increases at a rate based on the error from zero to a maximum demand also proportional to the error.

12. The system of claim 11, further comprising a powertrain control, wherein the controller further:
determines the threshold speed as the sum of a set speed limit and a predetermined offset; and
causes the powertrain control to reduce a propulsion torque output to attempt to reduce the vehicle speed to below the set speed limit.

13. The system of claim 11, wherein:
the controller derives the rate based on the error such that the rate limit operator lowers a limit in an increase in the rate faster in response to a comparatively lower error and slower in response to a comparatively higher error; and
the value of the rate is one of a continuous function of the error, based on predetermined ranges of the error, or received from a table-based lookup operator.

14. The system of claim 11, wherein the controller derives the maximum demand proportionally to at least one of increasing road grade, increasing trailer weight, increasing vehicle speed, and increasing torque output.

15. The system of claim 11, wherein the controller further derives the rate proportionally to at least one of increasing road grade, increasing trailer weight, increasing vehicle speed, and increasing torque output.

16. A method for assisting reversing of a vehicle with a trailer articulably coupled therewith, comprising:
controlling a vehicle steering system to maintain the trailer along a commanded path;
determining an excess speed error based on a detected vehicle speed and a threshold speed calculated based on the commanded path; and
controlling a vehicle brake system according to a torque demand that increases at a rate based on the error from zero to a maximum demand also proportional to the error.

17. The method of claim 16, further comprising:
determining the threshold speed as the sum of a set speed limit and a predetermined offset; and causing a powertrain control of the vehicle to reduce a propulsion torque output to attempt to reduce the vehicle speed to below the set speed limit.

18. The method of claim 16, further comprising:

deriving the rate based on the error such that the rate is faster in response to a comparatively lower error and is slower in response to a comparatively higher error;

wherein the rate is one of a continuous function of the error, based on predetermined ranges of the error, or received from a table-based lookup operator.

19. The method of claim 16, wherein the maximum demand is derived proportionally to at least one of increasing road grade, increasing trailer weight, increasing vehicle speed, and increasing torque output.

20. The method of claim 16, wherein the rate is further proportionate to at least one of increasing road grade, increasing trailer weight, increasing vehicle speed, and increasing torque output.

* * * * *